US007032000B2

(12) United States Patent
Tripp

(10) Patent No.: US 7,032,000 B2
(45) Date of Patent: *Apr. 18, 2006

(54) PEER-TO-PEER AUTOMATED ANONYMOUS ASYNCHRONOUS FILE SHARING

(75) Inventor: Gary W. Tripp, Bainbridge Island, WA (US)

(73) Assignee: Arcessa, Inc., Seattle, WA (US)

( * ) Notice: Subject to any disclaimer, the term of this patent is extended or adjusted under 35 U.S.C. 154(b) by 127 days.

This patent is subject to a terminal disclaimer.

(21) Appl. No.: 10/688,361

(22) Filed: Oct. 17, 2003

(65) Prior Publication Data

US 2005/0015466 A1 Jan. 20, 2005

Related U.S. Application Data

(63) Continuation of application No. 09/910,460, filed on Jul. 20, 2001, now Pat. No. 6,675,205, and a continuation-in-part of application No. 09/575,971, filed on May 23, 2000, which is a continuation-in-part of application No. 09/419,405, filed on Oct. 14, 1999, now Pat. No. 6,516,337.

(60) Provisional application No. 60/219,983, filed on Jul. 21, 2000.

(51) Int. Cl.
    *G06F 13/00* (2006.01)

(52) U.S. Cl. .................. 709/202; 709/203; 709/219; 707/10

(58) Field of Classification Search ............... 709/202, 709/203, 200, 217, 219; 707/10, 104
See application file for complete search history.

(56) References Cited

U.S. PATENT DOCUMENTS

| 5,838,916 | A | * | 11/1998 | Domenikos et al. | ........ 709/219 |
| 5,918,229 | A | * | 6/1999 | Davis et al. | .................. 707/10 |
| 6,067,551 | A | * | 5/2000 | Brown et al. | ............... 707/203 |
| 6,253,198 | B1 | * | 6/2001 | Perkins | ......................... 707/3 |
| 6,601,087 | B1 | * | 7/2003 | Zhu et al. | .................... 709/205 |

* cited by examiner

*Primary Examiner*—Viet D. Vu
(74) *Attorney, Agent, or Firm*—Black Lowe & Graham, PLLC

(57) ABSTRACT

A service on a computer network that performs centralized searches based on index information transmitted by peer systems to a central site using an agent program running on each peer. Peer systems are directed to each other for the purpose of retrieving files. If none of the peers systems known to contain the files is online (and the file is therefore not available), the request is placed in a queue of file requests maintained by the central site. When a system containing the requested file connects to the service, the requested file is retrieved from that system and then distributed to the other systems which had requested the file.

8 Claims, 34 Drawing Sheets

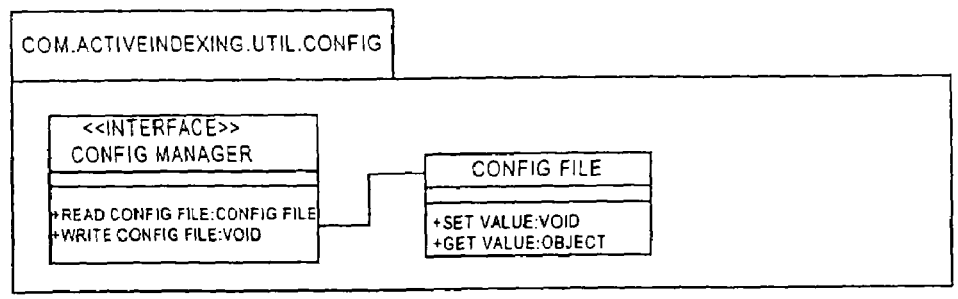
FIG.39
FIG.40
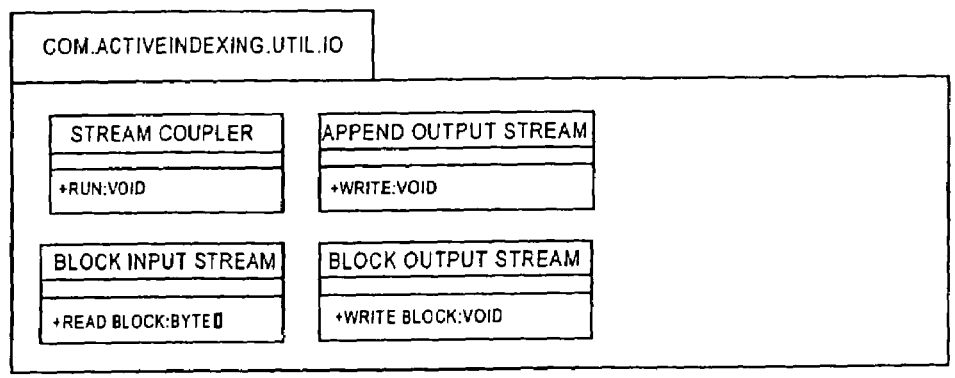

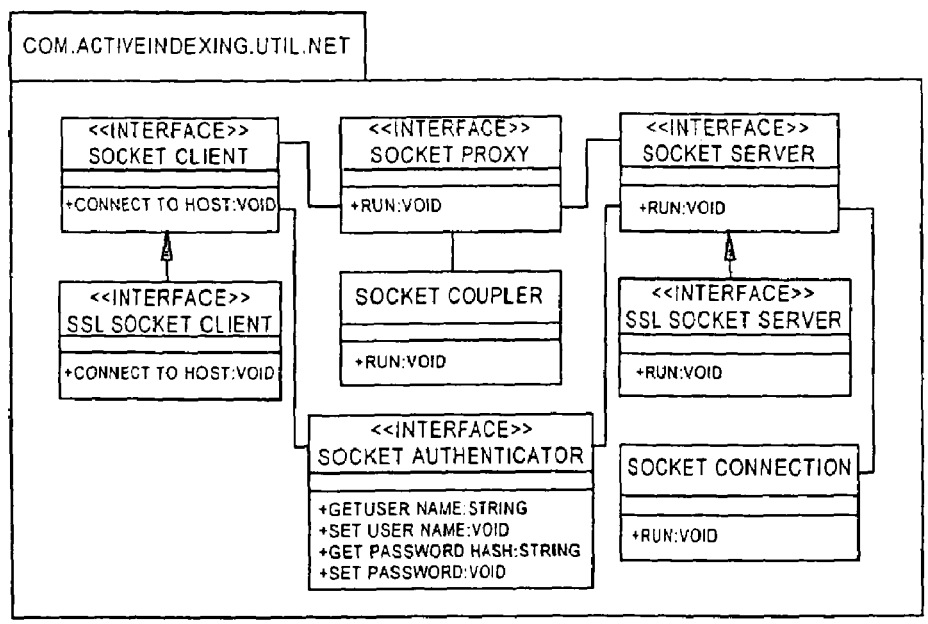
FIG.43
FIG.44
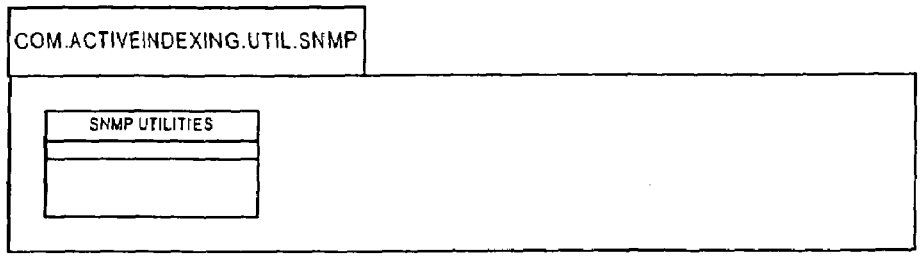

PEER-TO-PEER AUTOMATED ANONYMOUS ASYNCHRONOUS FILE SHARING

CROSS-REFERENCE TO RELATED APPLICATIONS

This application is a continuation of U.S. application Ser. No. 09/910,460 filed on Jul. 20, 2001 now U.S. Pat. No. 6,675,205, which is a continuation-in-part of U.S. application Ser. No. 60/219,983 filed on Jul. 21, 2000, U.S. application Ser. No. 09/419,405 filed on Oct. 14, 1999 now U.S. Pat. No. 6,516,337 and U.S. application Ser. No. 09/575,971 filed on May 23, 2000.

BACKGROUND OF THE INVENTION

A number of file discovery and sharing programs have become very popular for use across networks, especially those programs which permit the sharing of multimedia content. Users connect to a central directory service and upload a list of files that they currently have on their local system which may be requested by other participants in the directory service. To retrieve files, users send a request for a file to the central directory service which then connects the requesting user to another user's computer containing that file which computer is also currently online. The most popular program of this type is Napster, a utility for sharing audio files by manually registering them with a central directory service. Another popular program is Gnutella which shares more general-purpose files. The general term for both programs is a "peer-to-peer file sharing service".

An additional application which has been developed based on this model is a distributed search engine. Operators of host computer sites wishing to permit searches register with the central directory service and then answer queries directed to them by that service. When a user performs a search, the central service receives the request, compares the request to information about the content of each host, and then transmits a copy of that request to all hosts which are able to satisfy the type of the request. The search results subsequently received from these hosts are then processed and sent to the requesting user. This is very similar to the functioning of existing search engines except that the searches are distributed to and performed by the individual hosts registered to a directory service rather than by the central site. This approach is commonly called a meta search engine.

SUMMARY OF THE INVENTION

Expanding on the above concepts, the invented system is a service which performs centralized searches based on index information transmitted by peer systems to the central site using an agent program running on each peer, and then directs the peer systems to each other for the purpose of retrieving files.

If none of the peer systems known to contain the file is online (and the file is therefore not available), the request is placed in a queue of file requests maintained by the central site. When a system containing the requested file connects to the service, the requested file is retrieved from that system and then distributed to the other systems which had requested the file. Files retrieved for systems not currently online are held in a queue until the user connects or are emailed to the user, usually as an email attachment. Or, when a computer system containing the file connects to the central site, the file is sent by the system containing the file either to the central site or directly to the user who requested the file via email attachment.

The indexing and content reporting functions necessary for the service are performed by an individual copy of an agent program downloaded and installed by each peer system user. This agent program is described in detail in pending U.S. patent application Ser. Nos. 09/419,405 and 09/575,971 by the same inventors which are hereby incorporated by reference. The indexing process on each system may be initiated manually or on a scheduled basis, with updates transmitted whenever the user connects to the central service.

The agent is also responsible for transmitting copies of the requested file to the systems whose requests are waiting in the queue and picking up copies of files from the queue it had previously requested.

Unlike competing prior art systems, this agent-enabled system is able to maintain a central searchable index of the contents of the files, which is always available to users whether or not the site reporting the information found in the index is on-line.

This invention has great application not only in the general Internet market, but also in intranet markets where many users maintain local copies of files. It is also extremely useful for communities of users who wish to exchange similar information, or for mobile users who are not always able to be online at opportune times. This invention allows users to share files without having a web page.

This invention also allows the identity of each contributor of a copy of a file to remain anonymous. Only the central server knows the internet address and other identifying information about each contributor, and this information is stripped from each file before the file is forwarded.

This system also allows the sharing of files by systems which are protected by a secure firewall. The firewall prevents computers on the inside from serving files in response to conventional requests from the outside, but it allows the sending of an email with an attachment. To allow operation of the invented file sharing system without compromising the firewall, the agent program is configured to behave as follows. The agent reports to the central server the identities of files on the computer that will be provided if requested by others. When an email request for a file is received by the agent from the central server, the agent generates an email in response, attaching the requested file if that file is still on a list of files that may be provided by the agent.

BRIEF DESCRIPTION OF THE DRAWINGS

FIGS. 12–45 are figures illustrating components of the indexing system of FIG. 2 for a Java-based implementation of the indexing system according to one embodiment of the present invention.

DETAILED DESCRIPTION

This invention is preferably implemented as described in detail in pending U.S. patent application Ser. Nos. 09/419,405 and 09/575,971 by the same inventors which are incorporated by reference.

A domain name service (DNS) maps names (domain names) to addresses (Internet Protocol(IP) addresses). Domain names are scarce and expensive to obtain and maintain. A secondary DNS system could be built for the peer-to-peer network using peer-to-peer agents and the central index. Content providers could choose names (agent names) and those name would be associated with an agent indexing their site. Then, these names could be made known to others without providing the IP addresses, and the IP address can change and the content could still be found provided the agent name is not changed.

Figure 1:
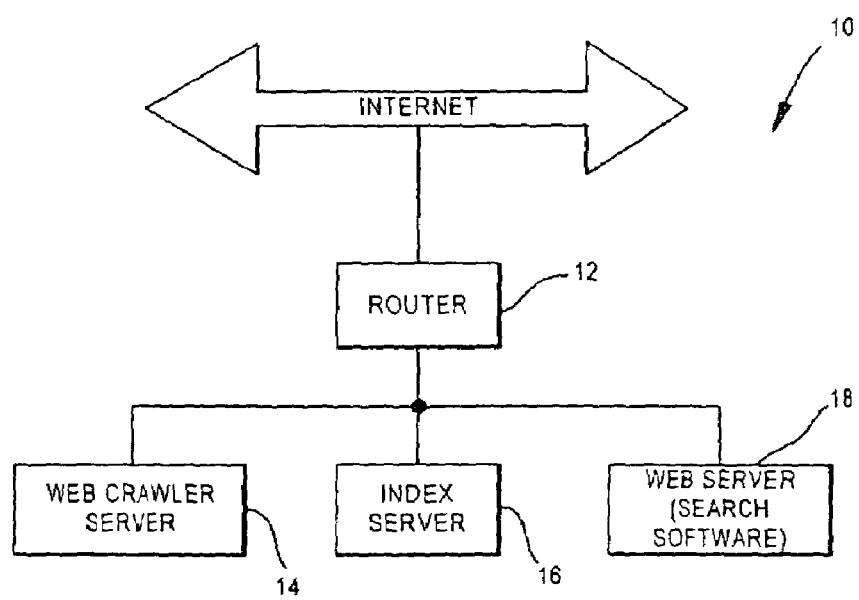
FIG. 1 is a functional block diagram of a conventional search engine for the world wide web.
Figure 2:
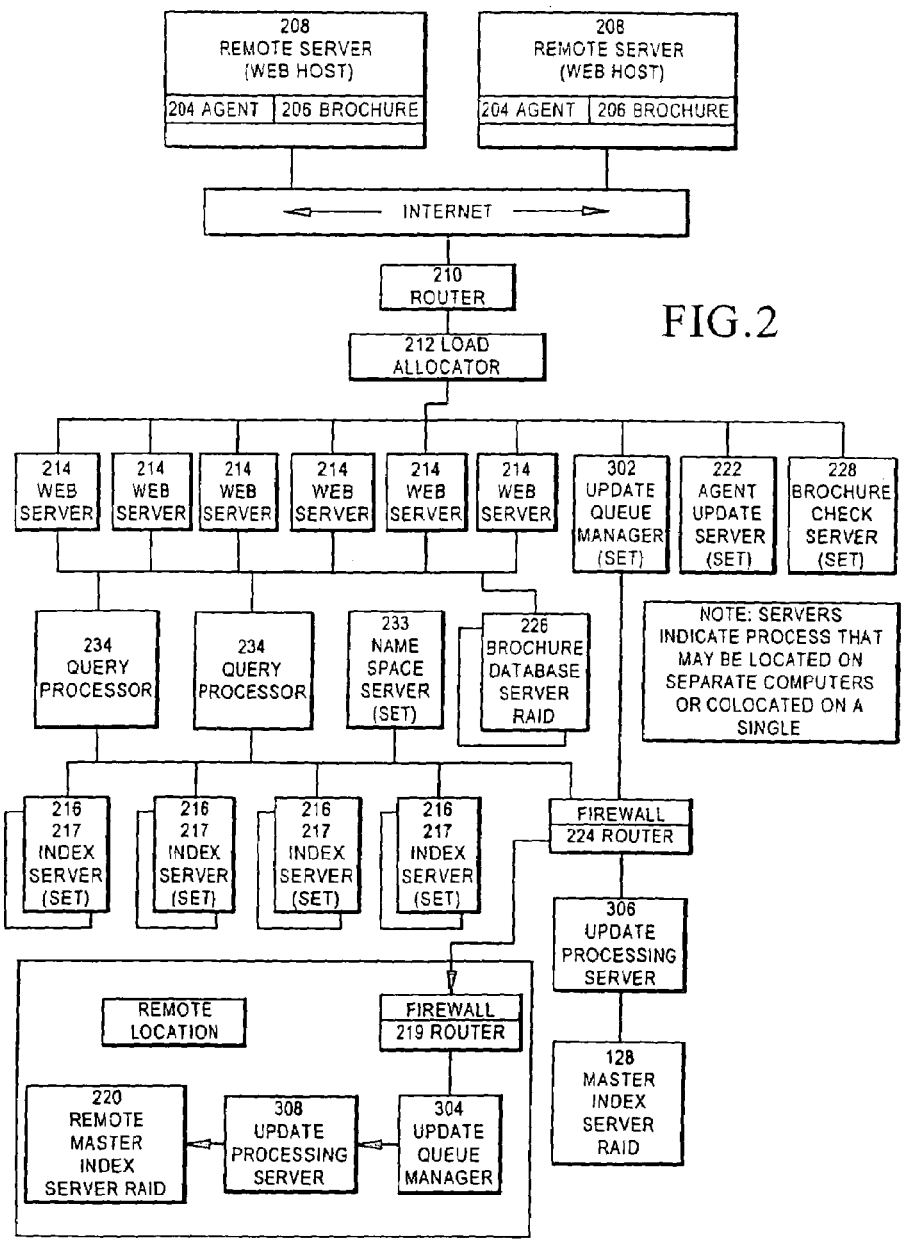
FIG. 2 is block diagram showing the architecture of a search engine for actively indexing the world wide web according to one embodiment of the present invention.

FIG. 2 is a block diagram of an indexing system 200 for actively indexing the Internet according to one embodiment of the present invention. The system 200 includes a central server 202 that stores a central index and processes search queries received over the Internet and also includes agent programs or agents 204 that reside on respective remote servers 208 and operate to provide periodic index updates to the central server 202, as will be described in more detail below. The system 200 also includes brochure files or brochures 206 residing on respective remote servers 208, each brochure file containing non-HTML or conceptual information about the Web site for use in generating the central index on the server 202, as will also be explained in more detail below. For the sake of brevity, only two remote servers 208 and the corresponding agents 204 and brochures 206 are shown in FIG. 2. The system 200, however, includes numerous such remote servers 208, agents 204, and brochures 208, as will be understood by those skilled in the art.

Each of the components in the central server 202 will now be described generally, with these respective components being described individually in more detail below. The central server 202 includes a router 210 that directs packets comprising search requests and update transactions through a load balancing switch 212 to an appropriate set of servers 214, 230 and 222. The switch 212 balances traffic to all web servers 214 to prevent overloading respective web servers and improve overall performance of the central server 202. The router 210 also functions to allow offline updates of index server sets 216 and as a dispatch point to prevent searches from being applied to an index server currently receiving updates, as will be explained in more detail below.

The web servers 214 receive and preprocess index queries and receive and process brochure 206 generation or modification requests. In addition, the web servers 214 generate the parallel queries necessary to perform a search using the index servers 216. In one embodiment of the central server 202, there are twenty web servers 214.

The central server 202 further includes a master index server 218 containing a master copy of the entire central search index or catalog. In the embodiment of FIG. 2, the master index server 218 has a redundant array of independent disks or RAID 5 to provide protection against disk failures and loss of the central search index. In addition, the central index stored on the master index server 218 is also stored on a remote master index server 220 at a different physical location to provide backup of the central search index.

A number of update servers 222 each receive updates from the agent programs and store the current version of the agent program for download and update of the local agent programs, as will be described in more detail below. In addition, the update servers store the digital signature of the agent program and also store the remote web hosts' last local index, which are utilized during the updating of the remote agent program and during updating the local index, as will also be discussed in more detail below. Each of the update servers 222 applies all index change transactions through a firewall/router 224 to the master index server 218 which, in turn, updates the central search index and then distributes those changes to the various index servers sets 216. The master index server 218 also sends instructions to the Name Space/Directory Server 233 to dynamically determine which set of index servers 216 is to remain on-line to service search requests, and which set is to receive the updates.

The central search engine 202 further includes a brochure database server 226 and brochure check server 228. The brochure database server 226 stores a brochure database as a list of brochures and their associated data fields for each web site. The web servers 214 may request records from or add records to this brochure database depending on the actions taken by web site administrators while maintaining their brochure entries. The brochure check server 228 periodically checks for valid new brochures as defined within the brochure database server for web sites that are not being processed by a local agent program, as will be described in more detail below. If the defined brochure in the brochure database server 226 is not found by the brochure check server 228, a notification is sent to the administrator of the site where the brochure was supposed to be found.

When a brochure file is requested for a site which is not served by an agent 204, a message is sent to the Internet Service Provider ("ISP") or system administrator for the site hosting the web site, indicating that users of the system are requesting brochures. This server also periodically checks the validity of existing brochures on all sites and notifies the web site administrator if a brochure file is missing. If a brochure is missing and remains missing for a given number of check cycles, the brochure check server 228 sends a request to the brochure database server 226 to delete the entry for the brochure. The brochure check server 228 detects any changes in brochures, such as additions or removals, and converts these changes to transaction batches that are forwarded to a queue manager which, in turn, applies these changes to update the central index on the master index server 218, as will be described in more detail below. The brochure check server 328 periodically verifies the status of all brochures at sites that are not being indexed by an agent 204.

The components of the central server 202 and their general operation have been described, and now the operation of the agent 204 and brochure 206 will be described in more detail. The agent 204 and brochure 206 may both be present at a remote server 208. A brochure 206 and agent can function independently of each other, as will be discussed in more detail below. The agent 204 is a small local program which executes at the remote server 208 and generates an incremental search engine update for all of the participating web sites on the web host 208. These index updates are transmitted by the agent 204 to the central server 202, where they are queued for addition to the central index.

The agent 204 runs on a system, such as a web host server, at the site of an organization, and processes content (objects) for all web sites available via mass storage from that system. The agent 204 processes all web sites located within the mass storage area to which it has access, unless configured to exclude some portion of a site or sites. The agent 204 uses the local web server configuration (object catalog or file system information) data to determine the root directory path (or other location information for the particular file system) for all web site file structures available. The agent 204 reads files directly from local mass storage, and indexes the keywords from the files and meta data about the files. In contrast, a spider program, as previously discussed, is located on a server remote from the local site and renders each web page file before tokenizing and parsing each page for indexing. The agent 204 follows the structure of the local mass storage directory tree in indexing the files, and does not follow uniform resource locators ("URLs") stored within the HTML files forming the web pages. Since the agent 204 is present at the remote server 208 and has access to files stored on the server's mass storage, the agent is potentially capable of retrieving non-html data for indexing from these locally stored files, such as database files and other non web-page source material. For example, a product catalog stored in a database file on the remote mass storage may be accessed and indexed by the agent 204.

While indexing the web sites at the remote server 208, the agent 204 recognizes brochures 206 stored at web sites on the server and provides index updates based on the contents of the brochures found. Once the agent 204 has indexed the web sites at the remote server 208, the agent transmits a transaction list to the central server 202, and this transaction list is stored on one of the update servers 222. The transaction list is referred to as a batch, and each batch contains a series of deletion and addition transactions formatted as commands. More specifically, each batch represents an incremental change record for the sites at the remote server 208 serviced by the agent 204. The update server 222 thereafter transfers each batch to the master index server 218 which, in turn, updates the master index to reflect the index changes in the batch. It should be noted that the agent 204 transmits only "incremental" changes to the central server 202. Conversely, a conventional spider program requests the entire rendered HTML page from the remote web site via the remote server 208, and then parses the received page for keyword information.

The brochure 206 is a small file that may contain conceptual and other non-HTML information which would be useful to improve the indexing of sites or parts of a single site on the remote server 208. A brochure 206 may contain any information pertinent to the web site, including but not limited to keywords, phrases, categorizations of content, purpose of the site, and other information not generally stored in a web page. The brochure 206 is generated manually by individual web site administrators. The administrator fills out a form at the central server 202, and receives an email containing the brochure 206 or downloads the brochure after submitting the form contents. Upon receiving the brochure 206, the administrator stores it within the file structure of the web site on the remote server 208. There may be multiple brochures 206 at the same web site, each describing specific portions of the site. Each brochure 206 may refer to a single web page or a group of web pages stored within a specific subdirectory at the web site. All information stored in each brochure 206 is applied to the pages referenced in the brochure.

Figure 3:
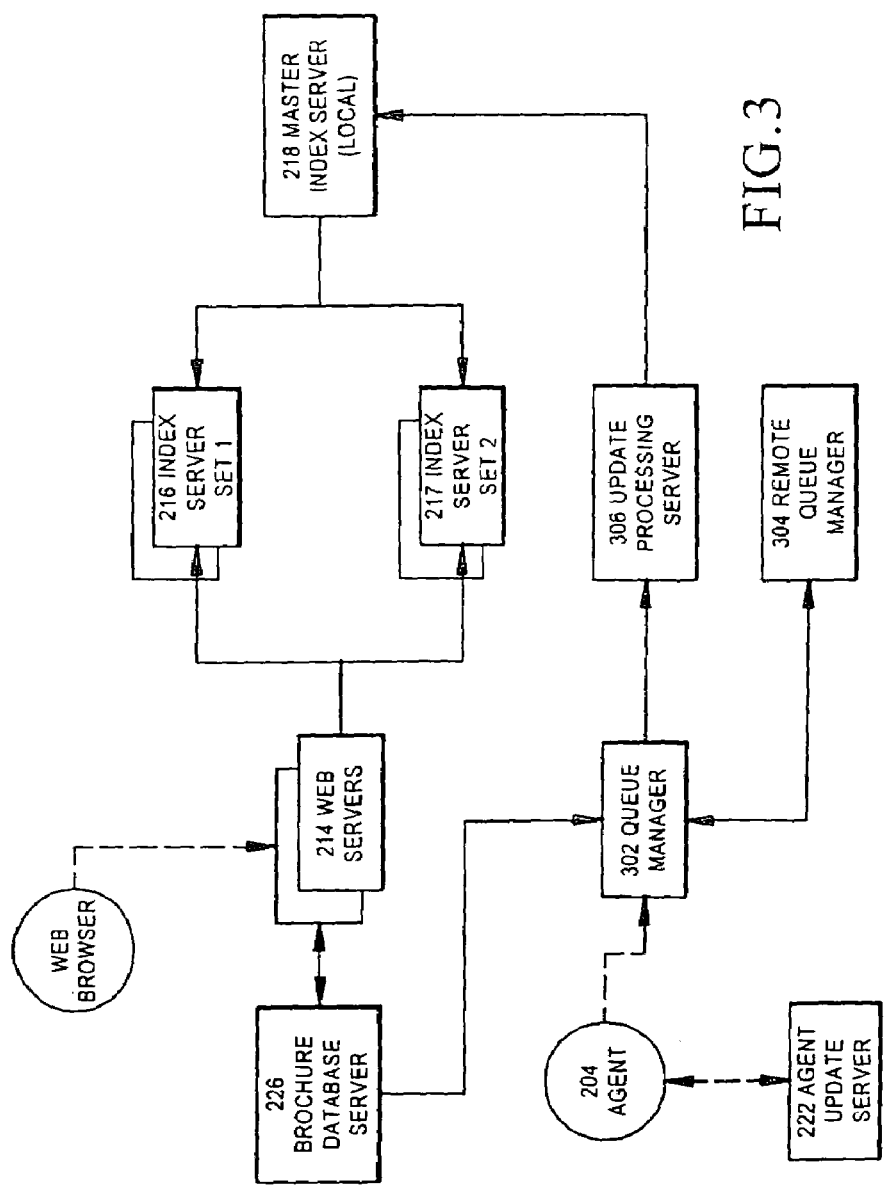
FIG. 3 is functional block diagram of the central server of FIG. 2.

The overall operation of the central server 202 will now be described in more detail with reference to the functional block diagram of FIG. 3. In FIG. 3, many components previously discussed with reference to FIG. 2 are shown, and for the sake of brevity the detailed operation of each such component will not again be described in detail.

In operation, the central server 202 performs three primary functions: 1) processing search queries from remote users; 2) brochure generation and verification; and 3) index update processing. In processing search queries from remote users, the Web servers 214 receive search queries from remote user browsers. A router, which corresponds to the routers 210 and 212 in FIG. 2, directs the search query to the appropriate web server 214. The web server send the query to a Query Processor 234 which parses the query and sends it to the available index server set 216 or 217 as listed in the Name Space Server 233 for appropriate segment of the index. The selected index server sets 216 or 217 thereafter return search results to the query processor in response to the applied search query, and these search results are sent to the Web server 214, which, in turn, returns the search results to the remote user browser.

The central server 202 also allows remote users to generate and download brochures 206 to their remote site, and also verifies the validity of brochures 206 on Web sites not serviced by an agent 204, as will now be explained in more detail. The Web servers 214 receive and process brochure 204 generation or modification requests from user browsers. Once the brochure 204 has been generated or modified, the brochure is transferred to the brochure database server 226, which stores all existing brochures. The brochure check server 228 periodically checks for new brochures 206 stored on the brochure database server 226 for Web sites that are not served by an agent 204. When a brochure 206 is requested for a Web site which is not served by an agent 204, the brochure check server 228 sends a message to the system administrator or Internet service provider for the server hosting a Web site telling them that site administrators on their server are requesting brochures 206. The brochure check server 228 also periodically verifies the validity of existing brochures 206 on all sites not serviced by an agent 204. If a brochure 206 is missing for a predetermined number of verification cycles, the brochure check server 228 instructs the brochure database server 226 to delete the entry for that brochure. The brochure check server 228 also converts any modifications, additions, or deletions to brochures 206 to transaction batches, and forwards these transaction batches to a queue manager 302. The queue manager 302 receives brochure update transaction batches from the brochure check server 228 and also receives agent update transaction batches from the agent update server 222, as will be described in more detail below.

The central server 202 also performs index update processing to update the central index stored on the master storage server 218 and the segmented central index stored on the index servers 216, 217, as will now be described in more detail. As described above, the queue manager receives update transaction batches from the brochure check server 228 and the agent update server 222. The agent update server 222 receives queries from the agent as to the current state of the agent's version and the status of the last index updates of the site. If the agent is not of a current version, a current version is automatically transmitted and installed. If the state of the site indexing is not consistent as indicated by a match of the digital signatures representing state of the site and the state of the central index the last time an update was received and successfully processed and added to the central index, then the agent will roll back to previous state and create the necessary additions and deletions to the state of the site and the central index into agreement. The agent 204 will then sent the additions and deletions along with a current digital signature to the queue manager 302 The queue manager 302 receives incremental index updates from the agents 204 present on the remote servers 208 and converts these updates into update transaction batches which, in turn, are transferred to the update processing server 306. The queue manager 302 stores the received update transaction batches, and periodically transmits a copy of the stored transaction batches to a remote queue manager 304 for processing by update processing server 306 and being applied to the remote master storage server 220. The queue manager 302 also periodically transmits a copy of the stored transaction batches to and update processing server 306. The queue manager 302 stores update transaction batches received from the agent 204 during a predetermined interval, and upon expiration of this interval the update batches are transferred to the update processing server 306. Upon receiving the update transaction batches the update processing server 306, applies all the batches to update the central index stored on the master storage server 218. Once the central index stored on the master storage server 218 has been updated, the master storage server 218 applies the update transaction batches through the router to update the segmented central index stored on the index server sets 216, 217.

During updating of the segmented central index stored on the index server sets 216, 217, the update transaction batches are directed to only one set of index servers 216, 217 while the other set remains online to handle search queries, and thereafter places the updated set of index servers 216, 217 online and updates the set previously online. For example, assume the index servers 216 are the primary set of index servers and the servers 217 are the secondary set. Each index server set 216, 217 can contain all or a portion of the central index 218. As seen from the above example, the primary and secondary index server sets 216 and 217 eliminate the need for record locking of the segmented central index to which search queries are applied. Thus, all records of the segmented central index are always available for search queries. Moreover, if one server of the primary index server set 216 or 217 fails, the remaining servers of that set will continue to serve queries. If the entire server set fails, the corresponding secondary index server set is made the primary so that the entire segmented central index is available for applied search queries. It should be noted that in the unlikely event that both the primary and secondary index server sets 216, 217 for a particular segment of the central index simultaneously fail, the remaining segments of the central index remain available for applied search queries, and only the segment of the central index stored on the failed index servers becomes unavailable. In other words, search queries are still applied to the vast majority of the central index so that reasonable search results may are still obtained. In a case were both server sets fail, queries for the segment that had failed could be sent to central index.

The index server set or sets are used to provide query results for searches submitted by the Web Servers. Each set of servers is identical, and each set of servers contains a portion of the overall index. Initially, the division will be alphabetical and numerical, for a set of 36 servers. Server "A" would contain the index for all words beginning with "A". Only one set of servers is updated at a given time, while the other set remains on-line to service search requests. This permits the system to be run without file-locking constraints and allows for fail over should a server become inoperative.

Figure 4:
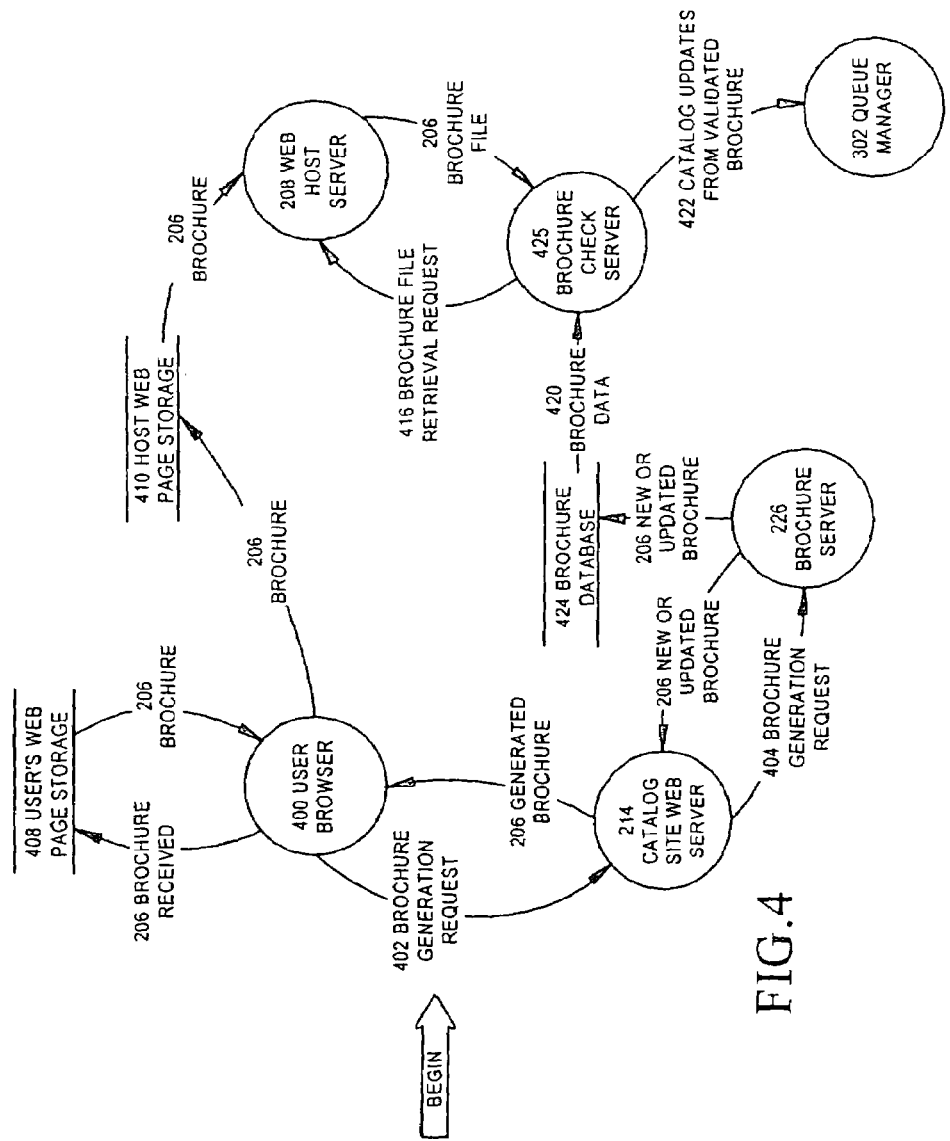
FIG. 4 is a bubble chart illustrating the generation and processing of a brochure file in the indexing system of FIG. 2.

FIG. 4 is a bubble chart illustrating the generation and processing of a brochure 206 in the indexing system 200 of FIG. 2. As previously mentioned, the purpose of the brochure 206 is to allow the web host 208 and the web site to provide specific non-HTML information, which will help the central server 202 in indexing the site and in order to provide more relevance to query results. The brochure 206 can be created in two ways. First, as part of the installation program for the agent 204, the administrator of the remote server 208 completes a form that is converted to an encoded brochure file 206, and then copied into the web directory on the remote server 208. This method of generating the brochure 206 will be discussed in more detail below. The second method of generating the brochure 206 utilizes a brochure creator interface on the web servers 214 at the central server 202. This method will now be described in more detail with reference to FIG. 4.

To create a brochure 206 using the brochure creator interface, a user's browser 400 applies a brochure generation request 402 to the associated central site web server 214. In response to the request 404, the brochure creator interface generates a form which the user completes, and then sends a brochure request 406 to the brochure server 226, which generates an encoded brochure file that is then sent to the central site web server 214. The central site web server 214 then sends the encoded brochure file to the user's browser 400. The encoded brochure file 206 is then stored in local storage 408. Subsequent to receiving the encoded brochure file 206, the user sends the encoded brochure file 206 via the user's web browser 400 to the web host site storage 410 (e.g., the web site host computer).

The brochure server 226 stores the brochure data 407 in a brochure database 424 on the central server 202 once it has been generated as a result of a brochure generation request 404. To verify proper storage of encoded brochure files 206, the brochure check server 425 retrieves brochure data 420 from the brochure database 424 and sends a request 416 to the web host server 404 to retrieve the encoded brochure file 206 from the web host site storage 410. Upon successful retrieval of the brochure file 206, the brochure check server generates and transmits object references 422 created as a function of the brochure data 420 to the queue manager 302. The queue manager 302 thereafter updates the central index to include the generated object references.

The directory structure of the host and web site are used to determine the relevance of the information in the brochure. Information in a brochure located the root directory will apply to all sub-directories unless superceded by another brochure. Information in a directory brochure will apply to all subdirectories unless superceded by information in a subdirectory brochure. Where a brochure is placed determines for which content the information applies. A web site owner can have as many brochures as there are pages or directories in his site. A site owner can request that their site be excluded from the Index by checking the EXCLUDE box next to the URL and copying the brochures into the directory to be excluded.

The host uses the configuration section of the agent program to create site brochures, and can create site brochures for an entire IP address or for any subsection of the site.

In addition to the host brochure, a web site owner may also place a site brochure on his web site. The purpose of the site brochure is to allow the web site owner to provide specific conceptual or non-html information, which will help in indexing their site.

The web site owner can create a different site brochure for each page or directory on the site. For example, if the web site includes pages in different languages, the web site owner should create a site brochure for each language with keywords and categories that match the language. Once the web site owner has filled in the brochure form, they will click a button on a web page from the web server at the central server, and a web server creates an encoded html file that is then sent or downloaded to the site owners computer. Each encoded brochure file could be given a particular name, such as brochure—domainname-com-directory-directory-directory.html, and the site owner is instructed to copy the encoded file into the specified web directory on the site.

At anytime, the web site owner can visit the central server site, update their brochure, and download a new encoded brochure. When updating an existing brochure, the current brochure information for the URL entered will be displayed to reduce input time. Any site brochure will supercede the host brochure information, and information contained in the site brochure will be assumed to be more current and accurate and will be used by the agent for indexing purposes. A site brochure that is farther down in the directory tree from the root directory will supercede a site brochure that is above it in the directory tree. A site owner can request that their web site be excluded from the index by checking the EXCLUDE box next to the URL and copying the brochures into the directory to be excluded.

If the host or web site URL is not currently being indexed, the web server performs the following operations. First, an automatic email is sent to contacts at the host to encourage the host to install the agent. An automatic email is also sent to a contact person for the web site with a "Thank You" and a request that they ask their host to install the agent. In addition, a retrieval order is generated for the central server to retrieve the brochure file from the web site in one hour. If the retrieval order is unsuccessful, it will be repeated 2, 4, 8, 24 and 48 hours later, until successful. If still unsuccessful after 48 hours, the retrieval order is canceled. By verifying the presence of the site brochure in the specified location, unauthorized information about a site may not be created by a third party in an attempt to have their site indexed along with a more popular site. This is a common problem with existing search engines where a third party copies the keywords from a meta tag in a popular site. The bogus site with copied keywords is then submitted to a search engine for indexing, and when search queries are applied to the search engine that produce the popular site the bogus site is also produced. This may not be done with the site brochure because the brochure is not an html page available to outside persons and because it is encrypted so even if the file is obtained the information contained therein is not accessible.

Software to create brochures and agent programs will be distributed free to software publishers for inclusion in their web authoring software and to web server manufactures, publishers and OEMs for pre-loading on or inclusion with their products.

Figure 5:
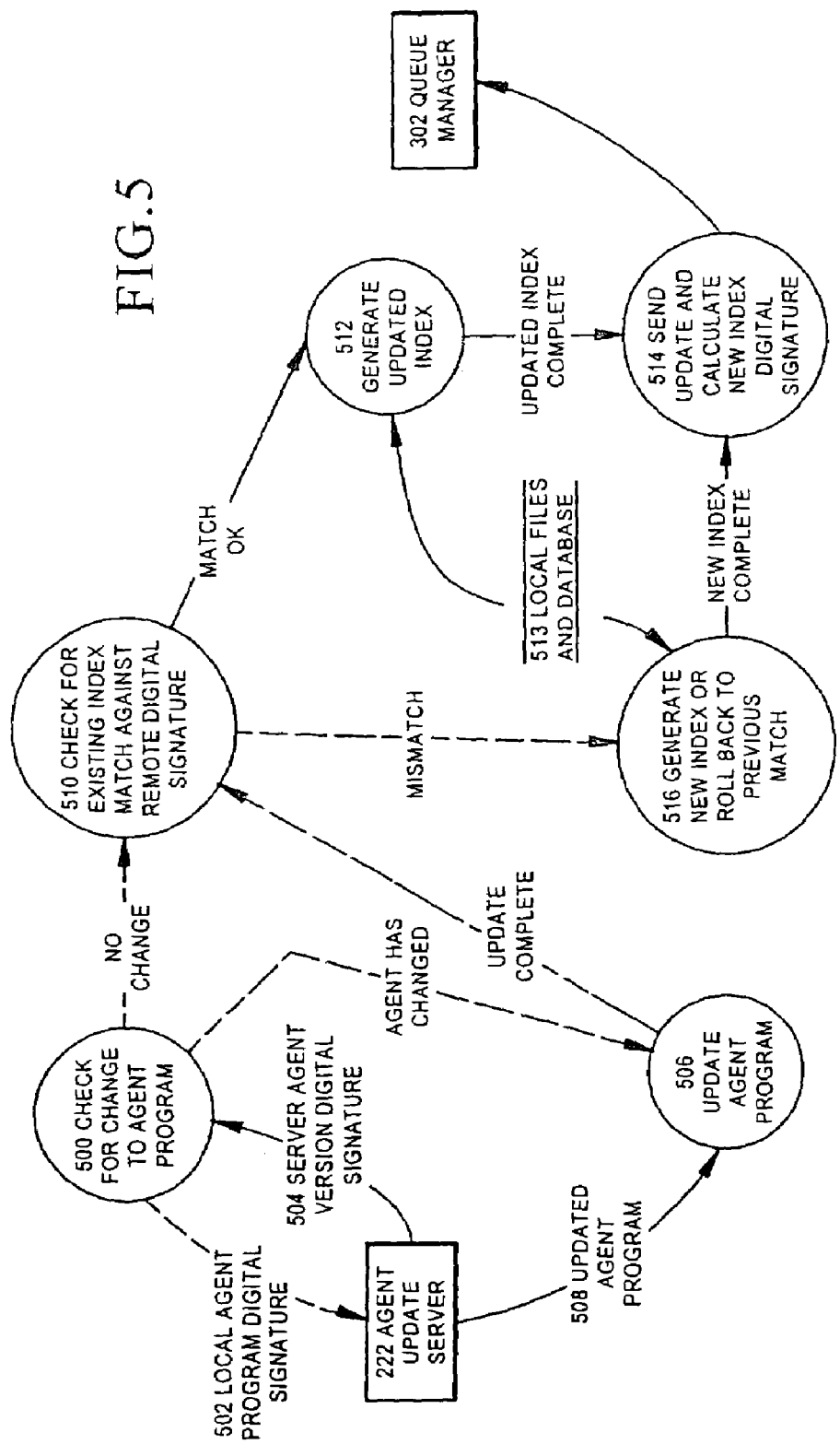
FIG. 5 is a bubble chart illustrating the process of the agent program in updating itself along with the local index generated by the agent program.

FIG. 5 is a bubble chart of the process executed by the agent 204 according to one embodiment of the present invention. As previously mentioned, the agent 204 periodically executes the illustrated process to update itself and to update the corresponding local index, as will now be described in more detail. The process begins in step 500 in which the agent verifies that it is the most current version of the agent program. More specifically, in step 500 the agent sends a request 502 to one of the update servers 222 for the digital signature of the current version of the agent program. The update servers 222 returns the digital signature 504 for the most current version of the agent. In step 500, the digital signature hash of the local agent is compared to the returned digital signature hash to determine whether the local agent is the most current version. In other words, if the two digital signatures are equal, the local agent is the most recent version, while if the two are not equal the local agent is an outdated version of the agent program and must be updated. When the two digital signatures are unequal, the program goes to step 506 in which the most current version of the agent program 508 is received from the update server 222. Once the local agent program has been updated, the program proceeds to step 510. Note that if the digital signature of a local agent program is equal to the digital signature 504 of the most recent version of the agent, the program proceeds directly from step 500 to step 510.

In step 510, the agent program compares the digital signature hash for the existing local index previously generated by the agent program to the digital signature hash stored on the central server 202 for the existing local index. The agent program performs this step to synchronize the local index and the remote local index stored on the central server 202 by ensuring the digital signature of the existing version of the local index matches the digital signature for the existing version of the remote local index. If the two digital signatures are equal, the agent program goes to step 512 and generates and updated local index by evaluating, such as by tokenizing and parsing, local files 513 on the web host serviced by the agent. Once the updated local index has been generated, the agent program proceeds to step 514 where the updates along with the digital signature of the new local index are transferred to the agent update server 222 on the central server 202.

If step 510 determines the two digital signatures are not equal, the agent program goes to step 516 to roll back to a previous state that matches the local files 513 or to generate a completely new local index for the web host serviced by the agent. After the complete new local index is generated, the agent program once again proceeds to step 514 and the updates are transferred to the agent queue manager 302. As previously mentioned, comparing the digital signatures in step 510 synchronizes the local index and remote local index. Furthermore, this step enables the agent program to rebuild a completely new local index for the site serviced by the agent program in the event the index is lost at the central server 202. Thus, should the central server 202 crash such that the central index is corrupted and non-recoverable, the agent programs at the each remote web host will rebuild their respective local indices, and each of these local indices will be transferred to central server 202 so that the entire central index may be reconstructed.

As mentioned above, the agent 204 is a software program that a web host downloads from the web servers 214 and installs on the host's server. To install the agent 204, the host runs an agent installation program, which collects information about the web site host and about the site itself, and also creates the web site host's brochure 206 of non-HTML information. As part of the installation, the site host schedules a preferred time of day for the agent 204 to automatically index the web site and transfer index updates to the central server 202. The agent and the queue manager can work independently or together to reschedule when to perform and transmit the site update. Resource availability is the primary and any other factor, which may effect the quality or efficiency of the operation may be used by the agent and the queue manager in rescheduling updates.

In the preferred embodiment the agent 204 initiates all communications with the central server over a secure socket authorized and setup by the site host. But the central server 202 could also initiate communications or trigger actions of the agent or retrieve data process by the agent. All data and program updates sent between the site host and the central server are sent in compressed and encrypted form. During the normal index updating process, the agent 204 is automatically updated, as will be explained in more detail below. The site host may receive a daily email saying the site had been properly updated or that no update was received and no action is required. The agent 204 also maintains a log of indexing activity and errors encountered, and this activity log can be viewed by the site host by opening the agent 204 and accessing the log. Although the agent 204 automatically indexes the sites on the host at scheduled times, the host can at anytime initiate an indexing update by opening the agent 204 and manually initiating an index update.

In operation, the agent 204 verifies that the agent program is current and that the site index matches the last update received and successfully added to the central index on the central server 202. After verification and updating of the agent 204 if required, the agent checks the site for new, modified or deleted files. The new or modified files are indexed and the information added to or deleted from the site index or a list of additions and deletions transactions are created. The incremental changes to the site index along with a digital signature of the entire site index are sent to the central server 202 and the results logged in a site activity log maintained by the agent 204. The agent 204 is run by either being manually started by the site host or automatically started by a scheduler component of the agent.

It is not necessary that a local index be maintained at the site but only that a list of digital signatures representing the site at the time of the last update be maintained. The digital signature could be used to determine whether the local site and the central index are properly synchronized and which portion of the site had changed since the last successful update. Then instructions to delete all references from the central index 218 to files located at the web host that have changed or which no longer exist would be sent by the agent to the queue manager. New references would then be created for all new or modified files and would be sent by the agent to the queue manager as additions to the central index 218.

The process executed by the agent 204 will now be described in more detail. The agent 204 first checks with the central server 202 for the current version of the agent program. More specifically, the agent 204 calculates a digital signature of the agent program files and contacts the central server 202 over a secure socket. The agent 204 then requests a digital signature of the current version of the agent program files located at the central server 202, and compares the two digital signatures. If the two signatures match, the version of the agent 204 is current and no update is required. When the two signatures do not match, the current version of the agent 204 is downloaded from the central server 202. Once the current agent 204 is successfully downloaded, the new agent program files are installed and the agent restarted.

At this point, the agent 204 begins the process of updating the index of the local site. First, the agent 204 determines whether the last index update was completed and transmitted successfully. If not, the agent 204 renames the Old—Site-Index file to Site-Index and the Old-Site-File-List to Site-File-List. The agent 204 then calculates a digital signature for the Site-Index file and a signature for the Site-File-List file and compares each to the digital signatures created at the end of the last successful update for Site-Index and Site-File-List files. If the digital signatures match, the agent 204 sends them to the central server 202 for comparison and waits for confirmation.

If the central server 202 does not confirm the match of the digital signatures (i.e., the signatures for the Site-Index and Site-File-List files on the central server 202 do not match those on the remote site), the agent 204 deletes the Site-Index and Site-File-List files, and notifies the central server 202 to delete all site records. Next, if the agent 204 was updated and Fields were added or deleted from the Site Index file, then the agent updates the Site-Index file to include the updates. The agent 204 then determines if the Site-File-Lists file exists, and renames the Site-File-List file to Old-File-List and create a text file named Site-File-List. If no Site-File-List exists but Old-File list exists, the agent 204 copies the Old-File-List file to Site-File List. If no Site-File-List and no Old-File-List files exist, the agent 204 creates a text file named Site-File-List. The agent 204 then calculates a digital signature hash for each file on the site and the host brochure and records the file name including full path and digital signature hash of all files.

If the central server 202 verifies that the digital signature hash of the Site-Index file and the digital signature hash for the Site-File-List file match, the agent 204 verifies the brochure files. More specifically, the agent 204 determines if the file brochure.html file name does not match the directory in which it is located. If the file brochure.html is not in the expected directory, the agent 204 sends a warning email to the site contact listed in the brochure, and then renames brochure.html to WrongDirectorybrochure.html.

If the agent 204 determines that all brochure.html files match the directory in which they are located, the agent 204 deletes a file named Exclude-File-List, creates a text file named Exclude-File-List, checks brochures for EXCLUDE sites flags, and adds file names of files to be excluded from the index to the Exclude-File-List file. The agent 204 then creates a Deleted-File-List file containing a list of files that no longer exist on the site in their original location. More specifically the agent 204 deletes the old Deleted-File-List file, creates a text file called Deleted-File-List, compares the Site-File-List file to Old-File-List file and records in the Deleted-File-List any files in the Old-File-List that are not in Site-File-List.

The agent 204 then creates a New-File-List file containing a list of files that where created or modified since the last update. To create the New-File-List file, the agent 204 deletes the current New-File-List file, creates a new text file called New-File-List, compares the file Site-File-List to the file Old-File-List and the file Exclude-File-List, and records in the New-File-List file any files in Site-File-List that are not in the Old-Site-File-List or in Exclude-File-List files.

Next, the agent 204 indexes the corresponding site and creates a new Site-Index file. More specifically, the agent 204 determines if the Site-index file exists, and, if yes, copies the Site-Index file to an Old-Index file. If the Site- Index file does not exist, the agent determines if the file Old-Site-Index exists, and if yes copies the Old-Site-Index file to Site-Index file. If Old-Site-Index file does not exist, the agent 204 copies a Sample-Site-Index file to the Site-index file.

The agent 204 then creates a New-Records-Index file and a Deleted-Records-List file. The agent 204 next removes records of deleted or modified files from the Site index. More specifically, the agent 204 deletes all records from Site-Index for files in New-File-List, deletes all records from Site Index for files in Deleted-File-List, and records the Host IP, URL, and record ID Numbers for each record deleted into Deleted-Records-List.

The agent 204 then runs an indexing program against all files in the New-File-List file and creates a record for each new key word, phrase, MP3, Video, Movie, Link and brochure information and adds these to the Site-index file. The agent 204 then copies each new record created to the New-Records-Index file. If new fields were added to the Site Index, the agent 204 runs the indexing program against all files for new field information and creates records in Field-Update-Index for all information found. The agent 204 then updates the Site-Index file from the Field-Update-Index file.

At this point, the Site-Index file has been updated, and the agent 204 calculates a digital signature for the Site-Index file. More specifically, the agent determines if the Update-Status file exists, and if so opens this file. If the Update-Status file does not exist, the agent 204 creates a text file called Update-Status and opens this file. The agent 204 then calculates the digital signature of the Site Index file, and records the Site-index digital signature along with the date and time in the Update-Status file. Next, the agent 204 calculates the digital signature of the Site-File-List file, and records the Site-File-List digital signature along with the date and time in Update-Status file.

Finally, the agent 204 creates a Site-Map file for the sites serviced by the agent. More specifically, the agent 204 determines whether the Deleted-File-List or New-File-List contain files, and, if yes, the agent deletes the Site-Map file. The agent 204 then generates a site map for the Site-Map file from the Site-File-List. Once the Site-Map file has been generated, the agent 204 sends New-Records-Index and Deleted-Records-List files to the central server 202. More specifically, the agent 204 opens a secure connection and contacts the central server 202. The agent 204 then compresses the files to be sent, encrypts these files, and sends the compressed and encrypted files in the New-Records-Index, Field-Update-Index, Deleted-Records-List, digital signature for the Site-Index, Site-Map, and the Site-File-List to the central server 202, which the uses these files to update the central index. Once the agent 204 has successfully sent this information to the client server 202, the agent 204 records the digital signature of the Site-Index file, the time of the successful transfer, the date and size of the files transferred in the Update-Status file, and thereafter deletes the sent files. The agent 204 then closes the secure connection to terminate the update process.

Figure 6:
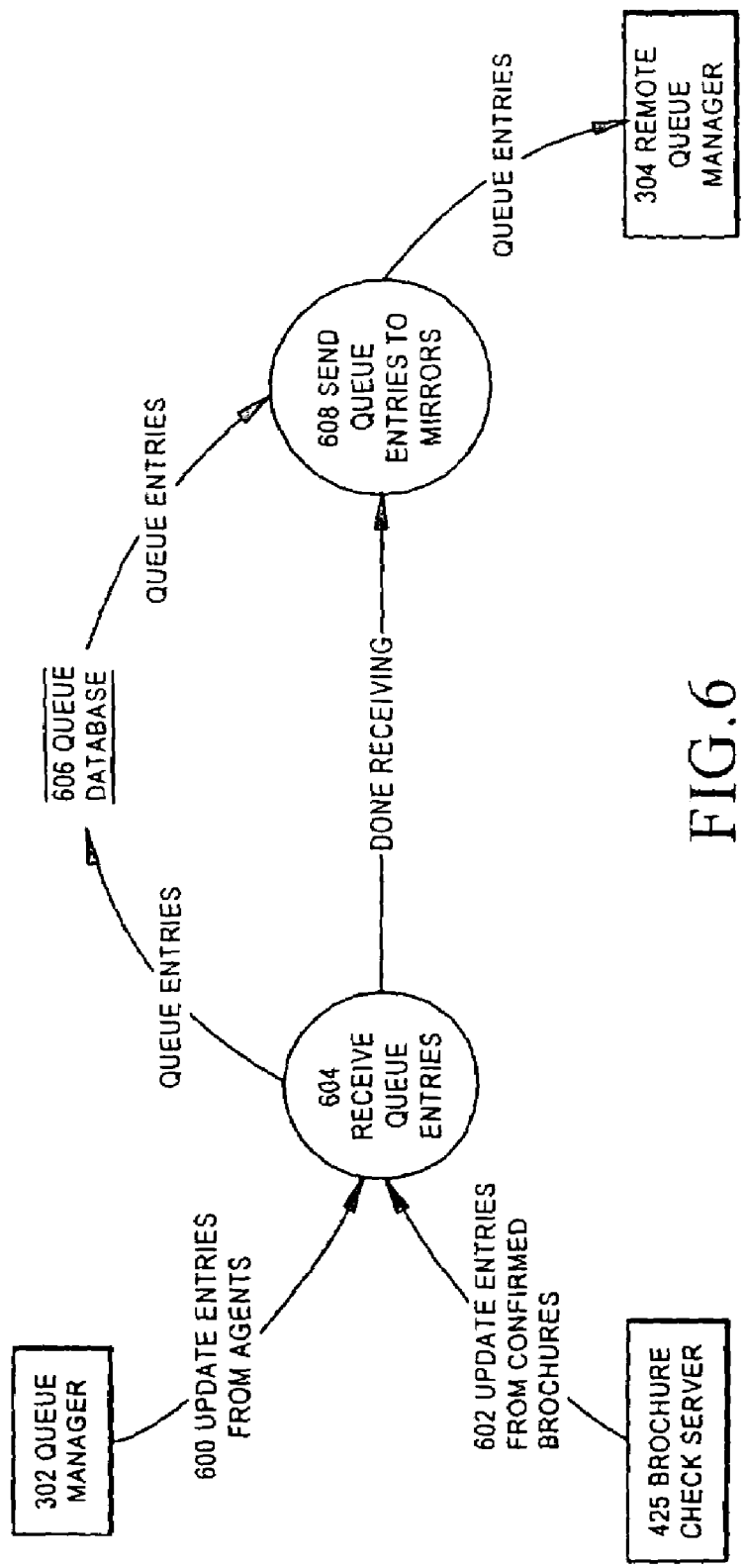
FIG. 6 is a bubble chart illustrating the process executed by the queue manager of FIG. 3 in queuing update entries and transferring these entries to the remote queue manager of FIG. 3.

FIG. 6 is a bubble chart illustrating the process executed by the queue manager 302 of FIG. 3 in queuing update entries and transferring these entries to the remote queue manager 304. The queue manager 302 receives update entries 600 from the agent update server 222 and update entries 602 from the brochure server 228, and places these update entries in an update queue 604. The entries in the queue 604 are transferred to a queue database 606. Once the queue 604 is done receiving update entries 600, 602, which may be when the queue is full or at predetermined intervals, the queue manager 302 goes to step 608 and retrieves the queue entries from the queue database 606 and sends them to the remote queue manager 304. As previously described, the update entries stored in the queue database 606 are thereafter processed by the update processing server 306 (see FIG. 3) to update the local master index on master index sever 218 (see FIG. 3). The queue manager 302 also receives a deletion request (not shown) from the update processing server 306 and deletes update entries stored in queue database 606 in response to this deletion request, as will be explained in more detail below with reference to FIG. 7. The queue functions are preferable implemented using a customized version of the standard UNIX email handlers, where each inbound email represents a request for a file or for the content of a file.

Figure 7:
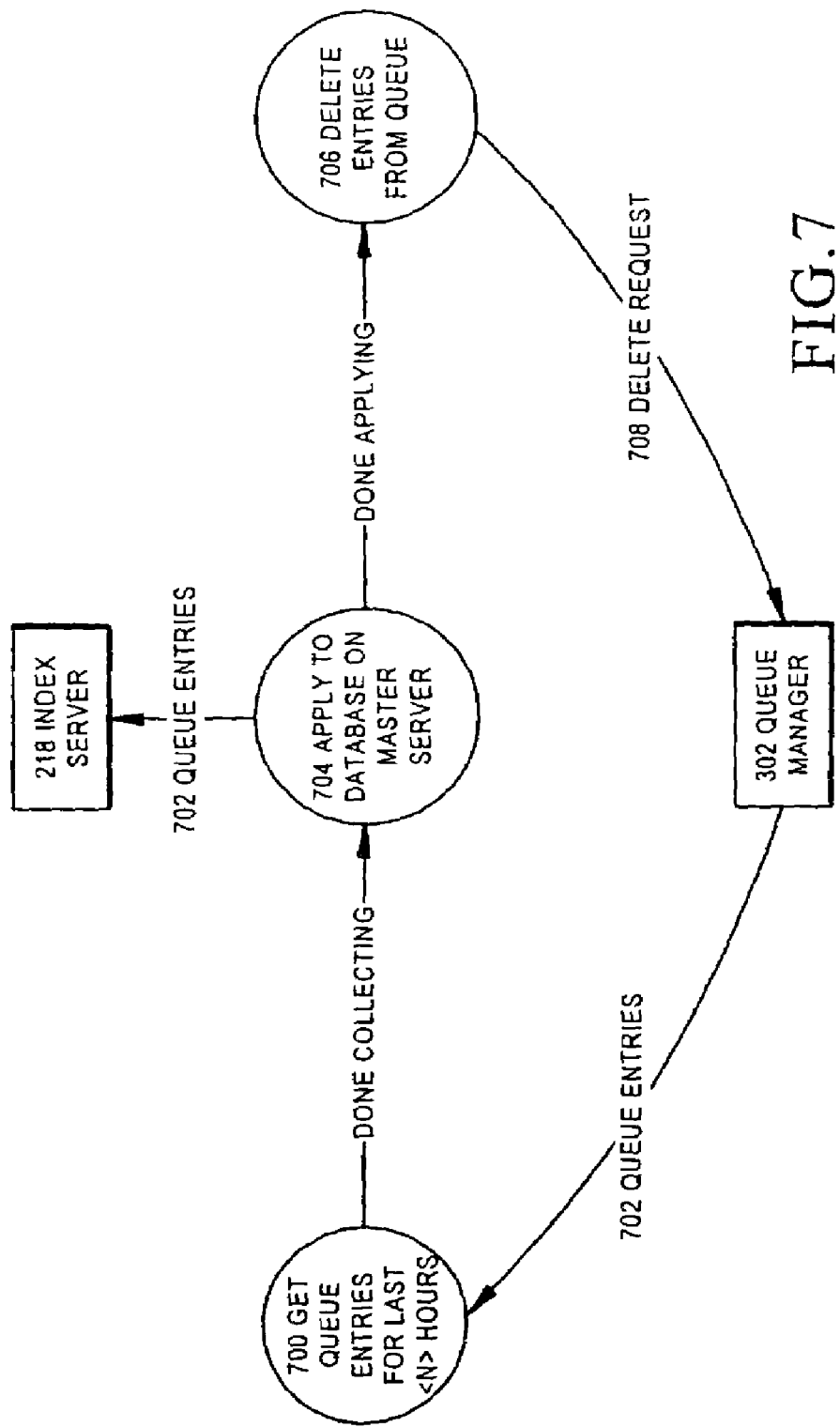
FIG. 7 is a bubble chart illustrating the process executed by the update process server of FIG. 3.

FIG. 7 is a bubble chart showing the process executed by the update processing server 306. The process begins in step 700 with the update processing server 306 retrieving queue entries 700 from the queue manager 304. In the embodiment of FIG. 7, the queue entries 702 are retrieved periodically so that in step 700 the queue entries for the last N hours are retrieved. From step 700, the process proceeds to step 704 and the update processing server 306 applies the queue entries to the master index server 218 which, in turn, utilizes the queue entries in updating the master index, as previously described. Once the queue entries 702 have been applied to the server 218, the process proceeds to step 706 and the update processing server 306 applies a deletion request 708 to the queue manager 302 (see FIGS. 3 and 6). In response the deletion request 708, the queue manager 302 deletes the update entries stored in the queue database 606 that have now been applied to the master index server 218. The central index on the master index server 218 has now been updated to include entries in the queue database 606, so these entries are deleted since they are now reflected in the central index and thus no longer needed.

Figure 8:
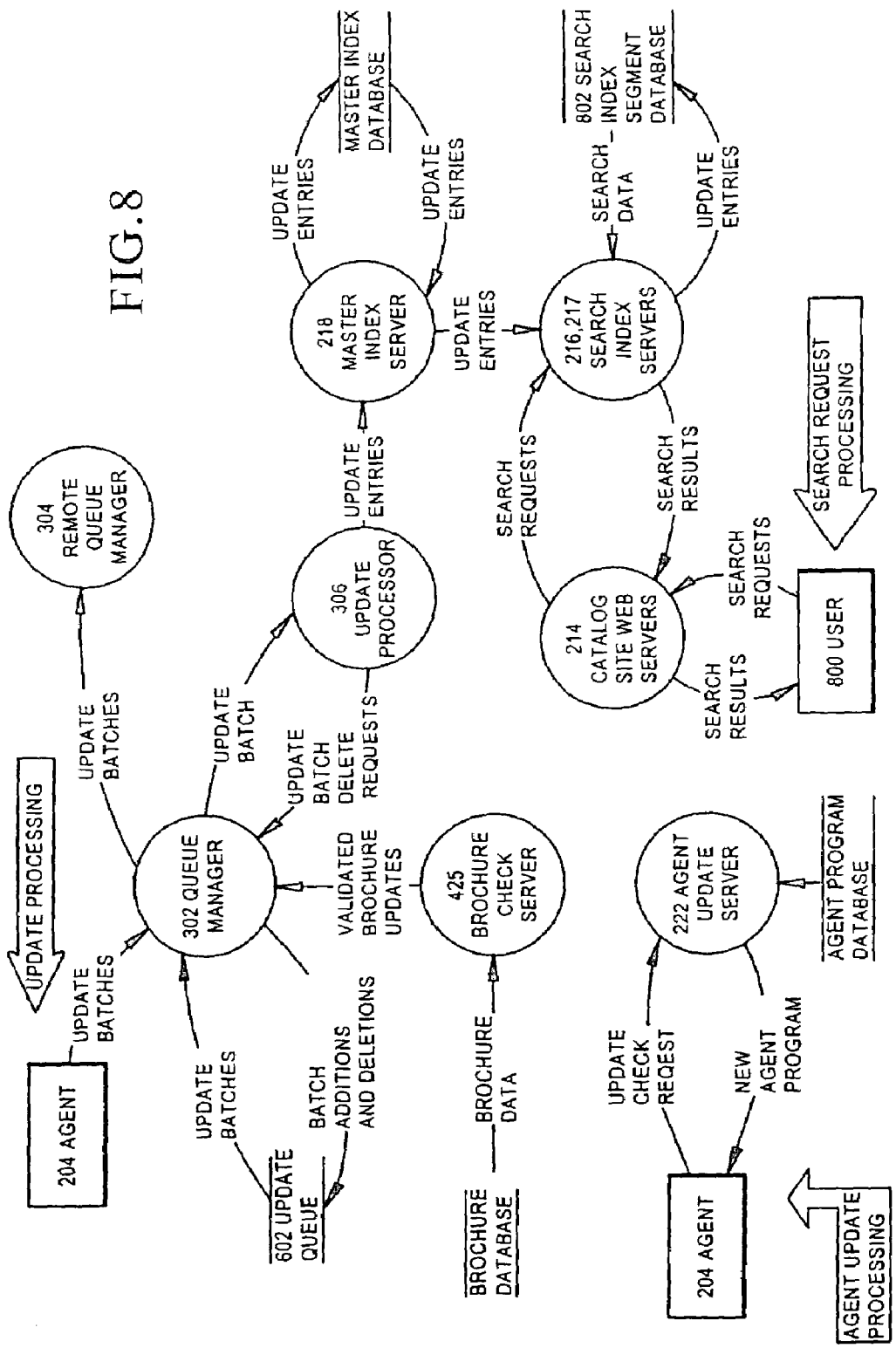
FIG. 8 is a bubble chart illustrating the overall data flow in the search engine of FIG. 3.

FIG. 8 is a bubble chart illustrating the overall data flow between the search engine 202, agent, and brochure components of the active indexing system 200. Each aspect of the overall data flow has already been described in a corresponding section above, and thus FIG. 8 will now be described merely to provide a brief description of the overall data flow of the indexing system 200 according to one embodiment of the present invention. The components of the process in FIG. 8 may logically broken into two functional groups, an indexing group and a searching group. In the searching group, a user 800 applies a search request to one of the web servers 214, which processes the search request and applies it to selected ones of the index servers 216, 217. In response to the applied search request, each of the search index servers 216, 217 queries its corresponding local index segment 802 and generates search data. The index servers 216, 217 then return the search results to the web server 214, which, in turn, provides the user 800 with the search results corresponding to his applied search request.

The web servers 214 also handle version queries from agents 204 on source sites. Each agent 204 sends a version check 804 that is processed by one of the web servers 214. In response to the version check 804, the web server 214 returns the digital signature of the most recent version of the agent 204, and also supplies the updated version 806 of the agent 204 to the source site if an update is required.

The remaining components in the FIG. 8 are in the indexing group. The queue manager 302 receives updates from each of the agents 204 and from the brochure check server 228, which services sites without an agent 204 as previously described. The queue manager makes update and deletions to the queue database 602 corresponding to the received updates, and also provides a mirror copy of these updates to the remote queue manager 304. The update processing server 306 retrieves the update entries from the queue manager 302, and applies the updates to the master index servers 218. The server 218 updates the master index to include the applied updates, and the update processing server 306 then sends a deletion request to the queue manager 302 to delete the corresponding entries from the queue database 602.

Once the master index server 218 has updated the master index, the server updates the segmented index stored on the search index servers 216, 217 as previously described. Each of the search index servers 216, 217 updates its corresponding portion of the segmented index in response to the updates from the master index server 218. As previously mentioned, the entire segmented index stored on the index servers 216 is continuously available for processing search requests even during updating of the segmented index. The entire segmented index is available due to the redundant architecture of the servers 216, 217, as previously described.

Figure 9:
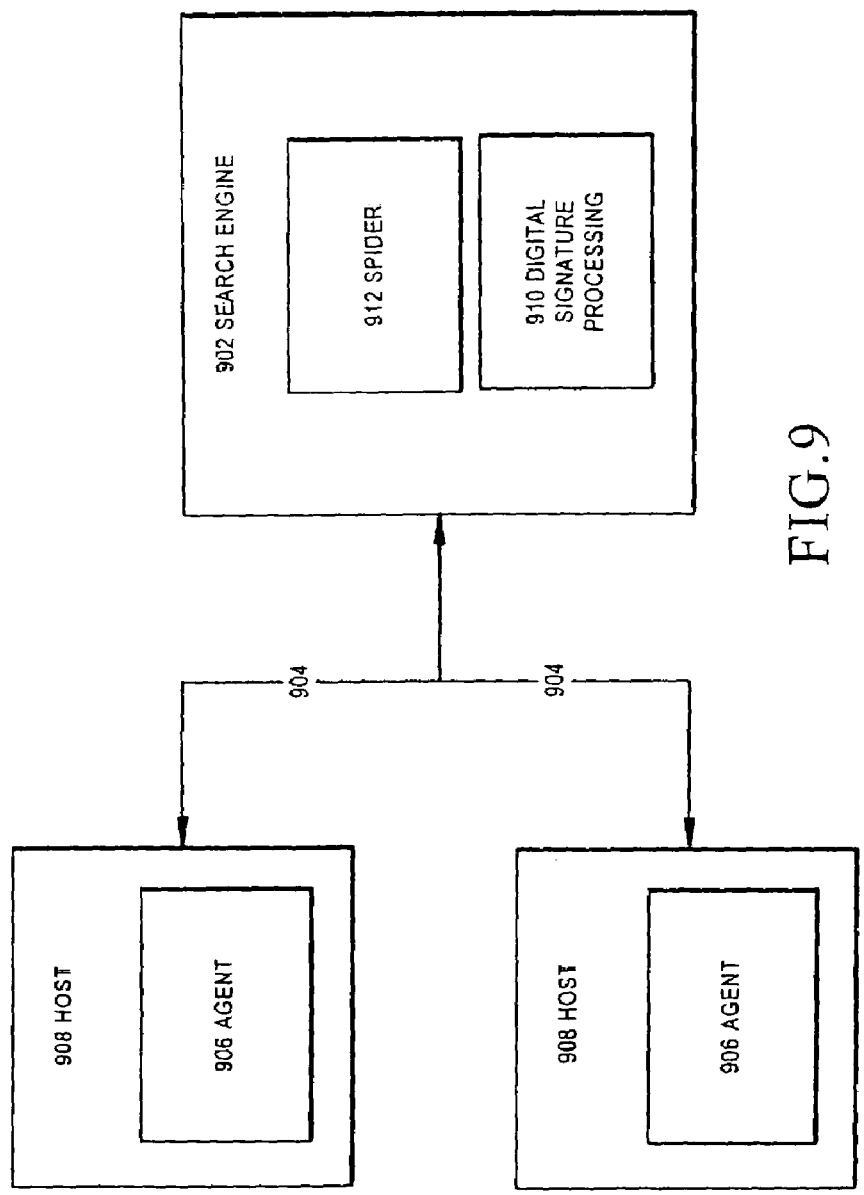
FIG. 9 is a functional block diagram of a distributed search engine according to another embodiment of the present invention.

FIG. 9 is a functional block diagram of a distributed search engine 900 according to another embodiment of the present invention. The search engine 900 includes a central search engine 902 connected over a network 904, such as the internet, to a plurality of agents 906, each agent being resident on a respective server 908. Each agent 906 generates a list of digital signatures related to retrievable information on the corresponding server 908 and provides these signature to the search engine 902 which determines which files to access for updating its index, as will now be explained in more detail. In the following description, the server 908 is a standard web server, but one skilled in the art will appreciate that the distributed search engine 900 can be implemented for a number of other services available on the internet, including but not limited to email servers, ftp servers, "archie", "gopher" and "wais" servers. Furthermore, although the agent 906 is shown and will be described as being on the web server 908, the agent 906 need not be part of the program which processes requests for the given service.

In operation, the agent 906 periodically generates a list of signatures and accessible web pages, which are then stored on the local web server 908. The digital signature generated by the agent 906 could be, for example, an digital signature of each file on the server 908. The list of digital signatures is then transmitted by the agent 906 to the search engine 902, or the search engine 902 may retrieve the list from the servers 908. A digital signature processing component 910 in the search engine 902 then compares the retrieved digital signatures against a historic list of digital signatures for files on the server 908 to determine which files have changed. Once the component 910 has determined which files have changed, a spider 912 retrieves only these for indexing.

The digital signatures may be stored in an easily accessible file format like SGML. Alternatively, the digital signatures could be generated dynamically when requested on a page by a page or group basis. This would insure that the signature matches the current state of the file. In addition, several new commands would be added to the standard http protocol. The new commands perform specified functions and have been given sample acronyms for the purposes of the following description. First a command GETHSH retrieves the digital signatures for a given URL and sends the signatures to the search engine 902. A command CHKHSH checks the retrieved digital signature for a given URL against a prior digital signature and returns TRUE if the digital signatures are the same, FALSE if not the same, or MISSING if the URL no longer exists. A command GETHLS retrieves a list of the valid URLs available and their associated digital signatures, and a command GETLSH retrieves the digital signature of the URL list.

Using the above command set, the search engine 902 need not request the entire contents of a page if that page has already been processed. Furthermore, there is no need to "spider" a site. Instead, the web server 908 provides the valid list of URLs which can then be directly retrieved. As an example, consider the following programmatical steps from the point of view of a search engine. First, given a web host 908, fetch the digital signature of the URL list. If the digital signature does not match a prior digital signature for the list, fetch the list of URLs from the web server. Thereafter, compare the list of URLs at the client web server 908 just retrieved to those stored locally at the search engine 902. From this comparison, a list of changed URLs is determined. The URLs that have changed are then retrieved and parsed for keyword and other indexing information. Once the indexing information is obtained, all URL's which do not appear in the retrieved list and the prior list are deleted from the search index on the search engine 902.

From the above description, one skilled in the art will appreciate that it is not necessary to retrieve all pages on the web site for every indexing process. Full retrieval of all web pages is necessary only once or if the entire site changes. This has several effects, the most important being that the amount of information transmitted is drastically reduced. The above method is but one possible implementation or embodiment. In another embodiment, a list of URLs on the search engine could be used and the individual checking of web pages done using the commands given. For example, the search engine 902 could tell if a page was current by simply retrieving its signature. If current, no other activity is required. Otherwise, the page might be deleted if no longer present or re-indexed if it has changed.

All content from a single agent/site could be searched for by a peer system user using the agent name. The search results could then be displayed to the user in a dynamically created "home page" for the content provider identified by that agent name. The dynamic home page would include a listing of every item indexed by the agent with that agent name and the item titles would be displayed along with their descriptions.

In a conventional search engine, the search engine normally requests that a web server deliver HTML documents to the search engine, regardless of whether the contents of the page have changed since the last recursive search. This is wasteful not only of CPU resources, but very wasteful of bandwidth which is frequently the most valuable resource associated with a web site. Thus, current search engines and content directories require regular retrieval and parsing of internet-based documents such as web pages. Most search engines use a recursive retrieval technique to retrieve and index the web pages, indexing first the web page retrieved and then all or some of the pages referenced by that web page. At present, these methods are very inefficient because no attempt is made to determine if the information has changed since the last time the information was retrieved, and no map of the information storage is available. For example, a web server does not provide a list of the available URLs for a given web site or series of sites stored on the server. Secondly and most importantly, the web server does not provide a digital signature of the pages available which could be used to determine if the actual page contents have changed since the last retrieval.

Another alternative embodiment of the process just described is the automated distribution of a single web site across multiple servers. For example, a web site would be published to a single server. Periodically, a number of other servers would check the original server to see if any pages have been added, removed or changed. If so, those pages would be fetched and stored on the requesting server. Another alternative embodiment is the construction of meta indexes generated as lists of URLs from many different web servers. Such a meta index would be useful as a means of providing central directory services for web servers or the ability to associate sets of descriptive information with sets of URLs. The method could also be used to create directory structure maps for web sites, as will be appreciated by one skilled in the art.

The indexing system 200 may be used not only on the global communications network but on corporate Intranets as well. A typical corporate intranet includes a central location, such as a corporate headquarters, at which a central searchable database is maintained, and a number of remote locations, such as regional offices or stores, coupled to the central location through a network of intranet. Each remote location transfers data to the central location for storage in the central database. The remote locations may also search the central database for desired information.

In transferring data from each remote location, data is typically stored at the remote location and then transferred to and replicated at the central location. One of four methods is generally used to update the central database, as previously discussed above under the Background section. First, all remotely stored data is copied over the intranet to the central location. Second, only those files or objects that have changed since the last transfer are copied to the central location. Third, a transaction log is kept at the remote location and transmitted to the central location, and the transaction log this then applied at the central location to update the central database. Finally, at each remote location a prior copy of the local data is compared to the current copy of the local data to generate a differential record indicating changes between the prior and current copies, and this differential record is then transferred to the central location and incorporated into the central database.

Each of these methods relies on duplicating the remote data, which can present difficulties. For example, redundant hardware at the remote and central locations must be purchased and maintained for the storage and transfer of the data over the intranet. Data concurrency problems may also arise should transmission of differential data from the remote locations to the central location be unsuccessful or improperly applied to the central database. Furthermore, if the intranet fails, all operations at remote locations may be forced to cease until communications are reestablished. A further difficulty is the author's loss of authority over his document and the responsibility for retention and data management decisions. In a centralized intranet, unregulated retrieval of objects from the central database to local storage can creates version control problems. Difficulty in handling revisions to an object may also arise in such a centralized system, with simultaneous revision attempts possibly causing data corruption or loss. Finally, in centralized system the size of the central database can grow to the point where management of the data becomes problematic.

With the architecture of the indexing system 200, everything, including each field in a local database, is treated as an object. Instead of copying each object to a central location, an object reference is created at each local site and sent to a cataloging location or locations. The objects are not duplicated in a monolithic central database. One advantage to this architecture is that the decision of whether to expose the existence and classification of local objects becomes the responsibility and choice of the author, rather than a generic decision. In the system 200, the implementation of retention rules and the physical location of the objects remain with the author. The searchable central catalog merely references the distributed objects, eliminating the need to make full copies and therefore manage a large storage system. Each local site generates and transfers information to the central server 202, or to a plurality of central servers for use in a searchable catalog.

Figure 10:
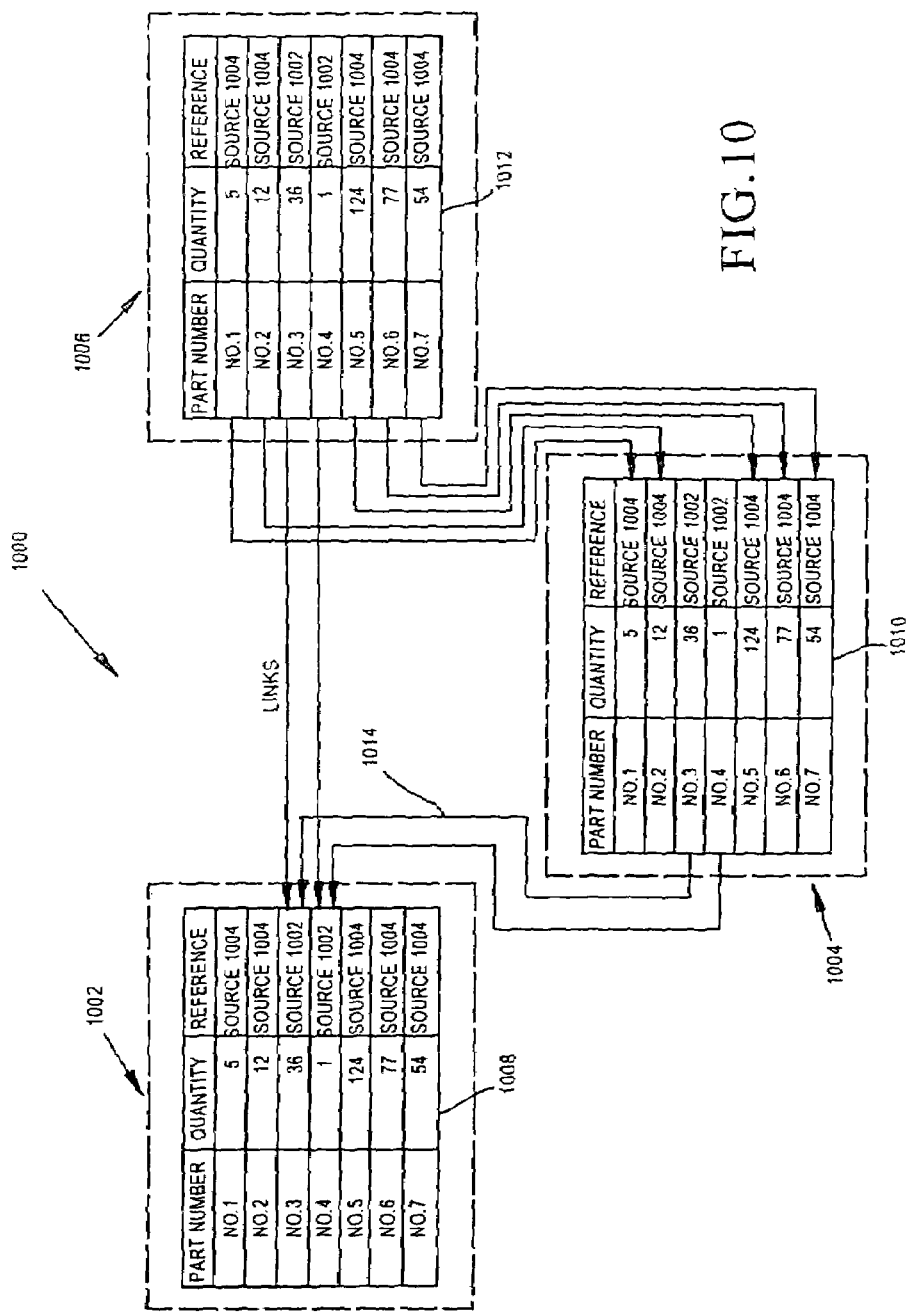
FIGS. 10 and 11 are diagrams illustrating operation of a distributed accounting and inventory system on an intranet according to one embodiment of the present invention.
Figure 11:
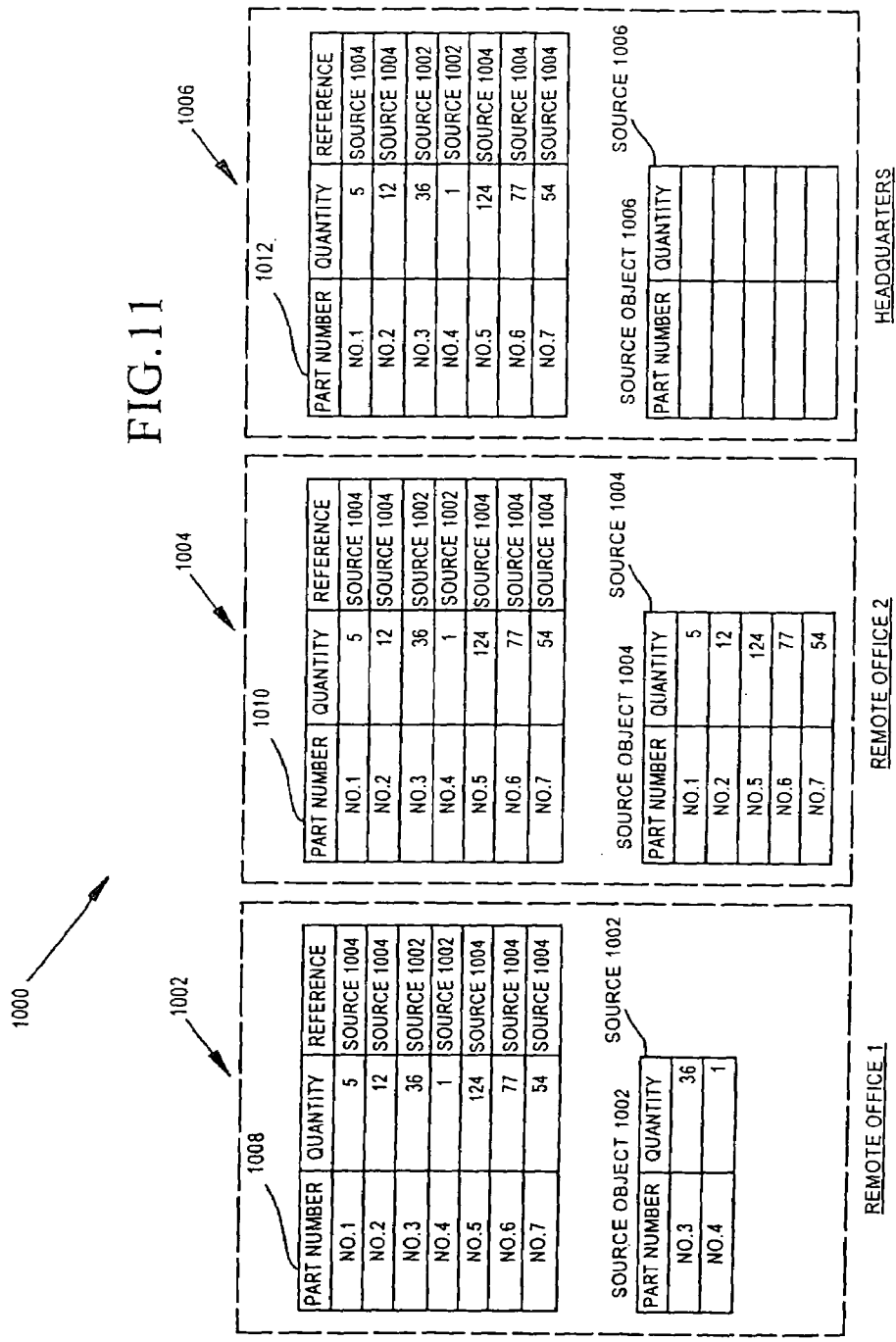
Figure 12:
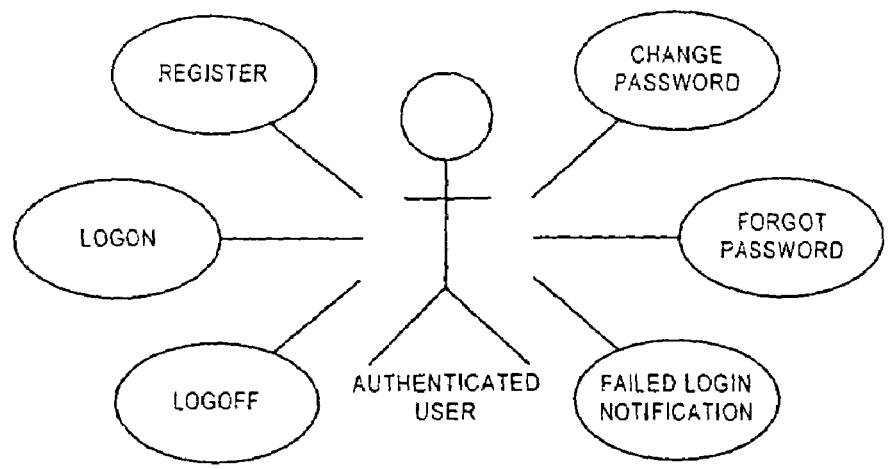
Figure 13:
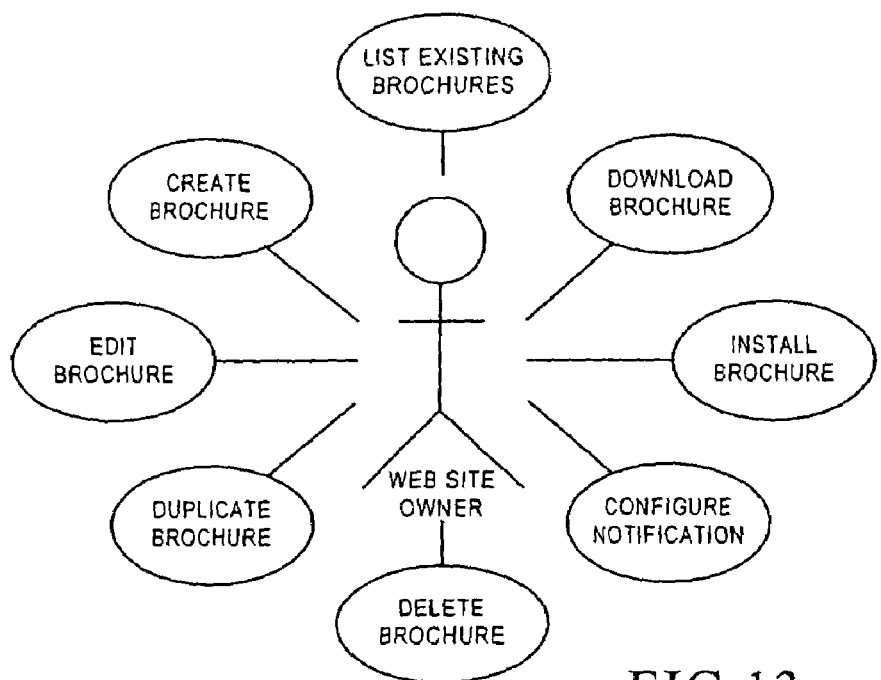
Figure 14:
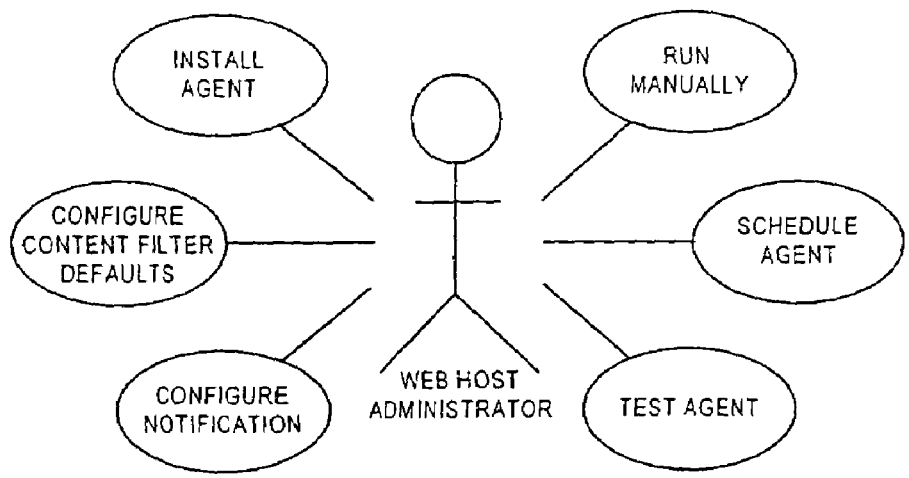
Figure 15:
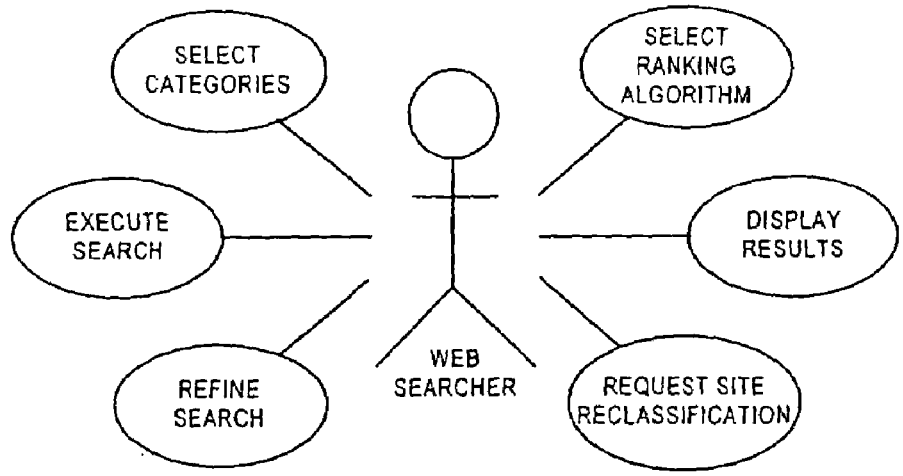
Figure 16:
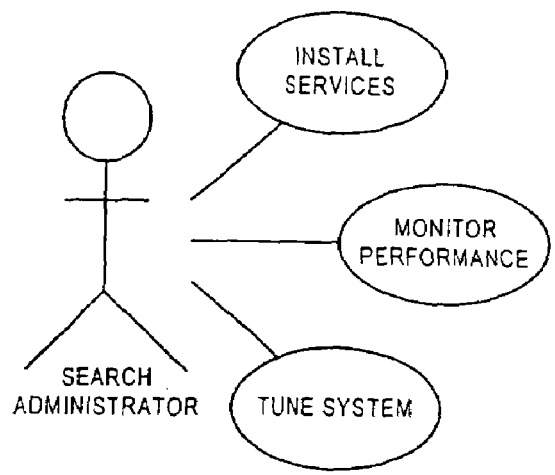
Figure 17:
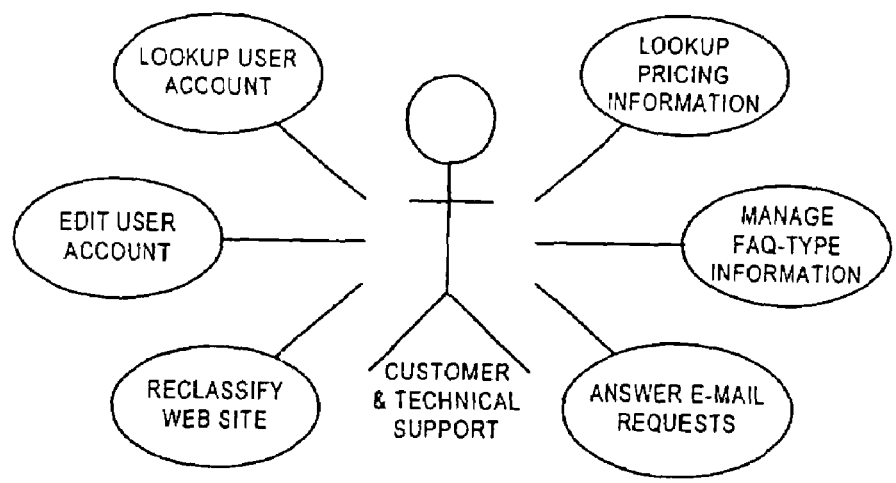
Figure 18:
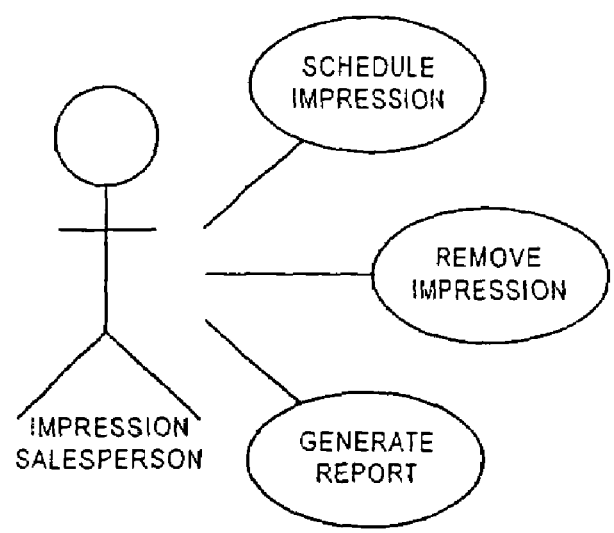
Figure 19:
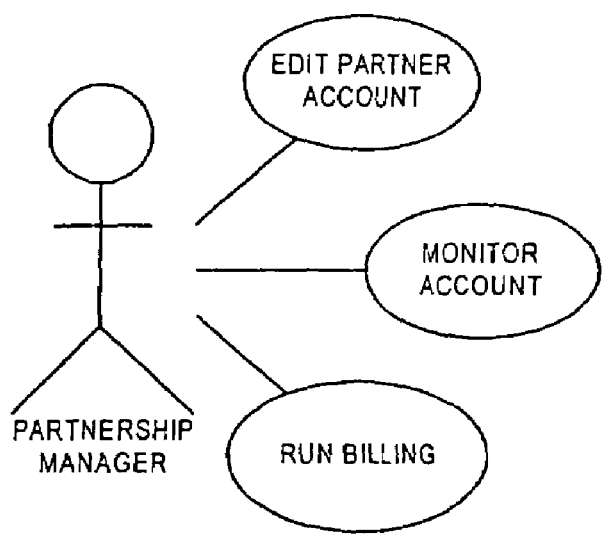

FIGS. 10 and 11 are diagrams illustrating operation of a distributed accounting and inventory system on an intranet 1000 according to one embodiment of the present invention. In FIG. 10, the intranet 1000 includes three different physical locations 1002, 1004, and 1006 including catalogs 1008, 1010, and 1012, respectively. Each location 1002–1006 also includes a source of objects (not shown in FIG. 10) that corresponds to an inventory of items at that location. The sources objects or sources for the locations 1002, 1004, 1006 are designated sources 1002, 1004, and 1006, respectively, in records of the respective catalogs 1008–1012. In the example of FIG. 10, the source 1006 is empty (i.e., no inventory items at location 1006). Each of the catalogs 1008–1012 is a catalog of object references to objects in the source at the corresponding location and to objects at the other locations. For example, the catalog 1010 at location 1004 includes a record for part no. 1, which is part of the inventory or source 1004 at this location. The catalog 1010 further includes an object reference, as indicated by the arrow 1014, for part no. 3, which is part of the inventory or source 1008 at location 1002. The catalog 1010 does not store a duplicate copy of the information in the record for part no. 3, but instead merely stores a reference to that object.

FIG. 11 is another diagram of the intranet 1000 expressly illustrating the sources 1002–1006 on the locations 1002–1006, respectively. The source 1006 is shown as containing no objects, such as may be the situation where the location 1006 is at a headquarters of a corporation. The sources 1002 and 1004 each include objects or inventory items, such as where these locations are remote offices of the corporation. This example illustrates that records for objects are not duplicated on each location 1002–1006, but instead object references in each of the catalogs 1008–1012 point to objects stored in remote sources.

The intranet 1000 provides several advantages in accounting or inventory control applications, and others. A conventional intranet requires the centralization of the catalog for purposes of control. The intranet 1000 separates the control of the physical inventory (objects in the sources 1002–1006) from accounting control. Since the whole intranet includes only objects and object references, then central reporting and planning can occur to the location 1006, but such reporting merely corresponds to data being read from the remote locations 1002, 1004, and no data is modified. In the intranet 1000, each location 1002–1006 functions as both a server and a client, and minor latency between the locations is not critical because within each location accounting and physical control remain linked. Latency need be considered only where authority to sell or transfer inventory (objects in the sources 1002–1006) is separate from the physical control of the inventory.

With the intranet 1000, the author of an object has physical control over that object and thus may decide what objects are to be exposed for searching by other locations.

As a result, the intranet 1000 is well suited for high-security management systems that typically require elaborate security procedures to prevent unauthorized duplication of data. For example, assume there are 200 remote information generators (offices, salespeople, etc.). With the intranet 100, data access to information in the objects is maintained through the use of the references available to both the central location and the remote.

The intranet 1000 also provides a more effective means to organize and describe organizational data, creating a much more flexible environment for data retention handling. A data retention handling system has two primary goals: 1) eliminate obsolete data to prevent confusion with current data and reduce storage requirements; and 2) reduce liability. Typically, hierarchical storage management ("HSM") systems have been used for these purposes. A HSM system stores frequently-used or relatively new files on high-speed, immediately available, and most expensive storage media. Older files or files that are not as frequently used are stored on "near-line" storage media that may consist of automatically mounted tape drives or CD-ROMs. Old files or files that are almost never used are stored off-line on tape or other inexpensive high-capacity media. Some files may eventually be deleted if they fall within certain parameters of usage, type, or age. The intranet 1000 overcomes these potential difficulties of a HMS system. For example, in the intranet 1000 duplicate copies of records are not maintained at each location, thereby eliminating the need for hierarchical storage media to provide the required access to stored records.

The agent 204 may also generate ratings for objects stored on the associated sites so that users may filter their searches based upon the generated ratings. For example, in one embodiment, an owner of a web site provides a rating of his site, such as a "G," "R," or "X" rating. In addition, the web host, on which the agent 204 runs, also provides a rating that the host believes applies to the site. The agent 204 then parses the pages on the site and looks for adult content "trigger" words, such as "XXX" or "XXX-Rated." If the agent 204 finds enough occurrences of such trigger words, the agent "flags" the web site for review to determine the correct rating for the site. To rate the site, the agent 204 compares the words in the web pages to words in a list of ratings values. The list of ratings values may be, for example, words that are generally found on adult web sites, such as profane and sexually explicit words. The list of ratings values may be generated by a human or may be automatically generated by the agent 204. To automatically generate the list, the agent 204 could, for example, parse known adult web sites. Such known adult web sites could be identified by determining those sites in the catalog that include the phrases "adult content" or "X-rated." Once these sites are identified, the agent parses the pages and determines frequently used words on such pages, and may also determine the frequency with which such words occur on these pages. The frequently used words and associated frequencies are then compiled to form the list of ratings values. After flagging web sites for review, the review may be either through human review of the web site or through automated review performed by the agent 204. In automated review of flagged web sites, the agent 204 could, for example, determine the frequency of occurrence of words in the list of ratings values, and then set the rating of the web site as a function of the frequency. For example, if the frequency is greater than some threshold T1, the web site is rated "R," and if greater than a second threshold T2, where T2>T1, the site is rated "X."

One proposed system for rating web pages on the Internet is described in *A Best Practices Model* by Members of the Information Society Project at Yale Law School, J. M. Balkin, Beth Simone Noveck, Kermit Roosevelt (Jul. 15, 1999), which may be found at http://webserver.law.yale.edu/infosociety/. In this proposed system, three layers are implemented to provide for rating web pages. The first layer includes a basic vocabulary of, for example, thirty to sixty terms that are used in rating a web page by a first party, typically the site owner containing the web page. The second layer includes rating templates developed to reflect a particular ideology. Third parties, such as the NAACP or Christian Coalition, would develop such templates to reflect a particular value system. The templates would include terms in the basic vocabulary being categorized and scalar values assigned to each item to reflect the value system. Finally, in layer three individuals could customize or modify a template to suit their individual values. For example, a template developed by the Christian Coalition could be further modified to include scalar values for web sites designated as racist by the NAACP.

The indexing system 200 could utilize such a rating system to perform filtering of search results at the central server 202. For example, user's browsers could be registered with the central server 202, and part of this registration would include selection of a template and any desired modifications to the selected template. Thereafter, whenever the user's browser applies a search query to the central server 202 the browser registration is identified and the search results generated in response to the query are "filtered" according to the template and any template modifications associated with the registered browser.

The indexing system 200 also may perform adult-content locking. In conventional search engines, adult-content web sites are automatically provided in response to applied search queries. The only way for a user to filter adult-content is through a filter on his browser. Thus, current search engines are "opt-in" only in that the search engine does not preclude adult-content pages from being returned in response to applied search queries. Conversely, in one embodiment of the indexing system 200, the user is automatically opted out of receiving adult-content web pages in response to applied search queries. The user must reverse this default "opt-out" status and elect receive adult-content web pages in the system 200. This could be done, for example, by registering a browser with the system 200 so that when the registered browser is identified adult-content web sites will be returned in response to applied search queries. Alternatively, a machine level lock using the computer or machine identification, such as the CPU or Windows identification number, could be utilized. In this approach, regardless of the browser being utilized on the computer, adult-content is either returned or not returned in response to applied search queries. This approach may be particularly desirable for parents who want to preclude their children from accessing adult-content since a child cannot merely use a new browser on the same machine and thereby circumvent the filter the parent has on his or her browser.

The indexing system 200 may also perform ranking of web pages having references in the central index. First, the agent 204 may perform positional and contextual rankings for particular words in the web pages on a site. The positional rankings assign a ranking value to a word based upon, for example, the location of the word in the web page and the position of the word relative to other words in the page. The contextual ranking is determined using contextual information about the site contained in the brochure 206. For example, if a word in a web page corresponds to a category as listed in the brochure 206, the word will be assigned a higher ranking. In addition to rankings generated by the agent 204, the central server 202 also generates rankings for the central index. For example, the central server 202 may generate rankings based upon whether a page is a source or reference to the desired data. Rankings may also be determined based upon user input such as the usage or popularity of a site as measured by how often the site is linked as the source site in other sites, or through positive comments entered by users about the context or ranking of a site. All the methods of ranking just described are know as static rankings, meaning that the ranking is determined before a particular search query is applied.

In addition to static rankings at the central server 202, the central server may also perform dynamic ranking of search results. Dynamic rankings are a function of the applied search query, and are not predetermined and independent of the query. For example, if the applied search query is "red barn," the word "barn" is probably more important than "red" so search results including the word "barn" will have their ranking increased relative to those containing only the word "red." Furthermore, ratings could be applied to search queries to create another type of dynamic ranking at the central server 202. Finally, a user may select which ones of the previous methods of rankings should be applied in ranking search results generated in response to his applied query. For example, a user could specify that his search results are to be ranked only on the basis of popularity, or only on the basis of positional and contextual rankings and the applied search query. Another example for the use of dynamic ranking is using the information in the brochure 206, the search results can be ranked dynamically based on the geographic distance from the searcher.

The server architecture of the system 200 will now be described. The server architecture provides a number of services which support the management and use of index information. The system is divided into several components which can be run on different machines, as needed, in a truly distributed architecture. The design must scale well and be self-healing wherever possible. To make this possible, Jini technology plays an important role in the architecture and services are exposed using that infrastructure. As components are brought online, they advertise that their existence to the local Jini lookup service. This information is automatically propagated to services who need access to other services and handshaking brings elements into the Jini community as they are announced. If non-critical parts of the system become unavailable, the system is able to compensate by distributing load to other machines hosting the necessary services.

A load balancer allows round-robin distribution of incoming traffic to web servers and the agent listener. The web servers provide user services like account registration, agent downloads, brochure management, and search capabilities. The AgentListener is a secure socket listener that manages agent connections. One of the components is a UserAccessService, which controls access to the BrochureService. Users can make queries on the search index. These are handled by the QueryDispatchManager, which delegates subqueries to appropriate IndexSegmentServices. Incoming information from agents is added to the MessageQueueService and popped off by the UpdateManagerService, which coordinates information in the BrochureService to ensure we have the latest updates. Agent-collected changes are added and/or removed in the MasterIndexService.

Figure 20:
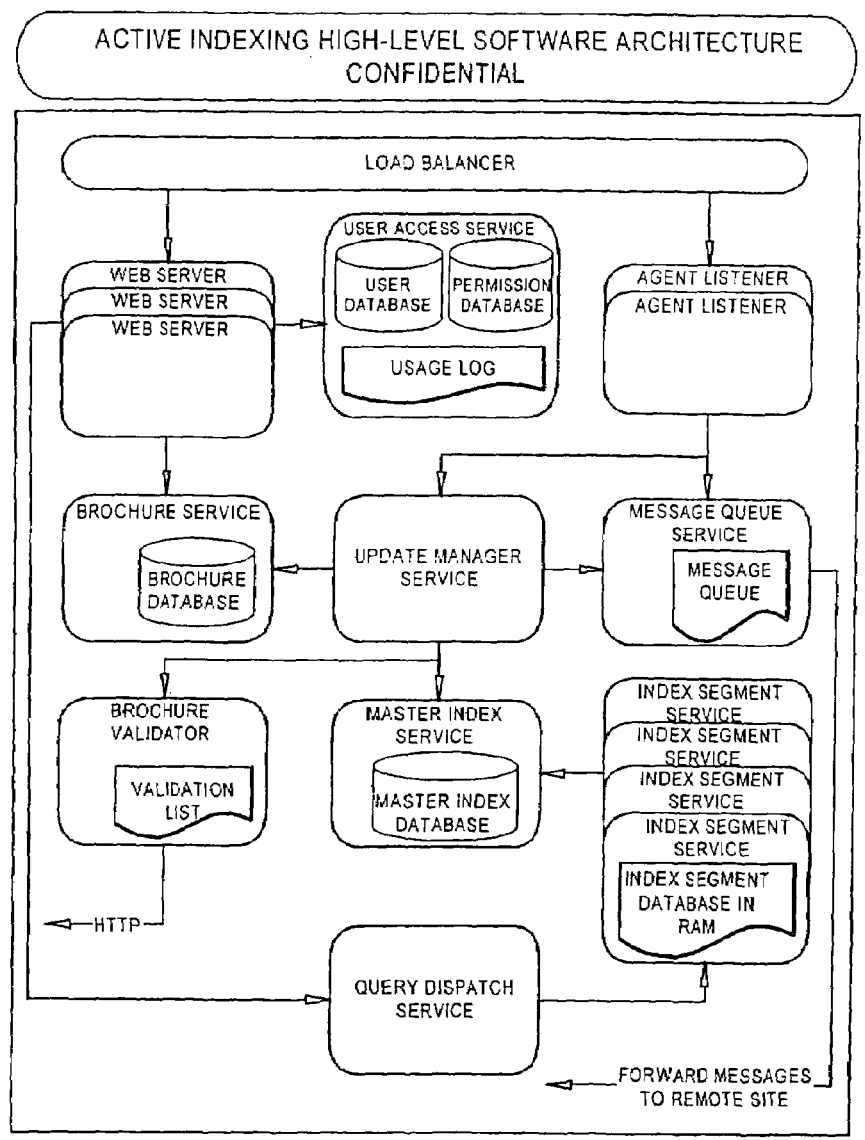

FIG. 20 shows request/response flow with the direction of arrows. The intent is to make clear who is asking for the execution of respective services. The web server, serving up static and dynamic content through Servlets and Java Server Pages, can communicate with the UserAccessService, BrochureService and the QueryDispatchService, but nothing else. The AgentListener can talk to the UpdateManagerService and the MessageQueueService only. An IndexSegmentService is able to initialize itself by asking from information from the MasterIndexService. Finally, the UpdateManagerService can talk to the BrochureService, MessageQueue service and the MasterIndexService. Its job is to keep the MasterIndexService up to date by processing incoming agent messages.

Because we are using Jini, the order in which services are brought up can determine which other services can operate, but does not restrict that order in any way. If an UpdateManagerService is unavailable, for example, the system will not process updates from the message queue, but processing will resume as soon as the UpdateManagerService is brought up again. As long as more than one instance of a given service is available, the system can discover those services automatically, as they are brought online. An IndexSegmentService is associated with a given IndexSegmentRange, which determines the prefix character range for the index content.

When an IndexSegmentService is brought online, it automatically becomes available to the QueryDispatchService. If one of these services are reinitialized periodically, the update will be completely transparent, so long as other IndexSegmentService cover the same IndexSegmentRange. This might be a single server or may be distributed arbitrarily across a number of IndexSegmentService instances. So long as a QueryDispatchService instance is available to the web servers, and sufficient IndexSegmentService instances are available to cover the full range of possible tokens, the system is capable of executing queries.

The data structures are critical to the correct operation of a complex system. The following description outlines the more important structures that represent the means by which subsystems may interact or store their information persistently in the system 200.

Figure 21:
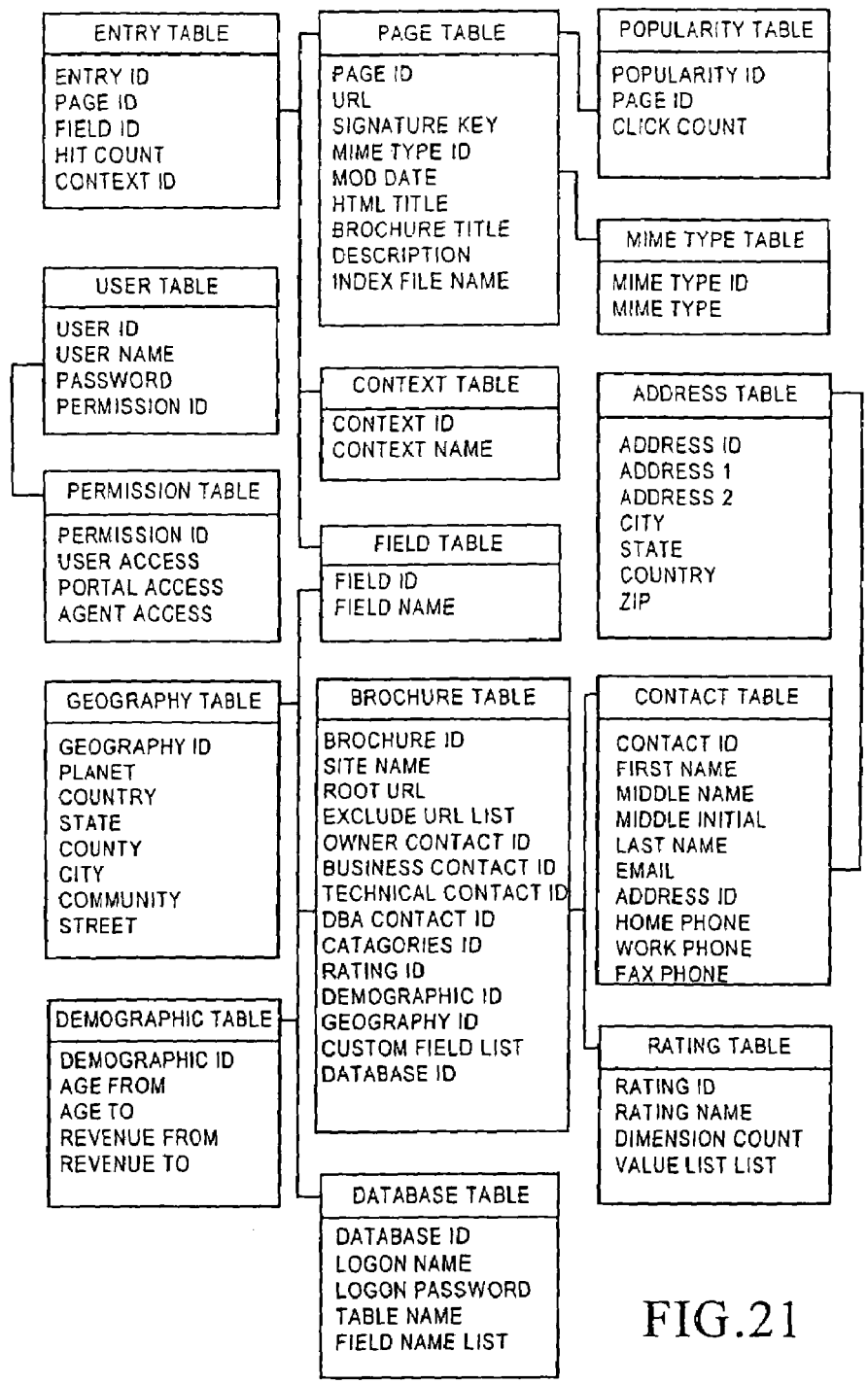

Persistent information is stored in a database or in temporary files on the system 200. The database tables relate to each other as shown in FIG. 21.

Figure 22:
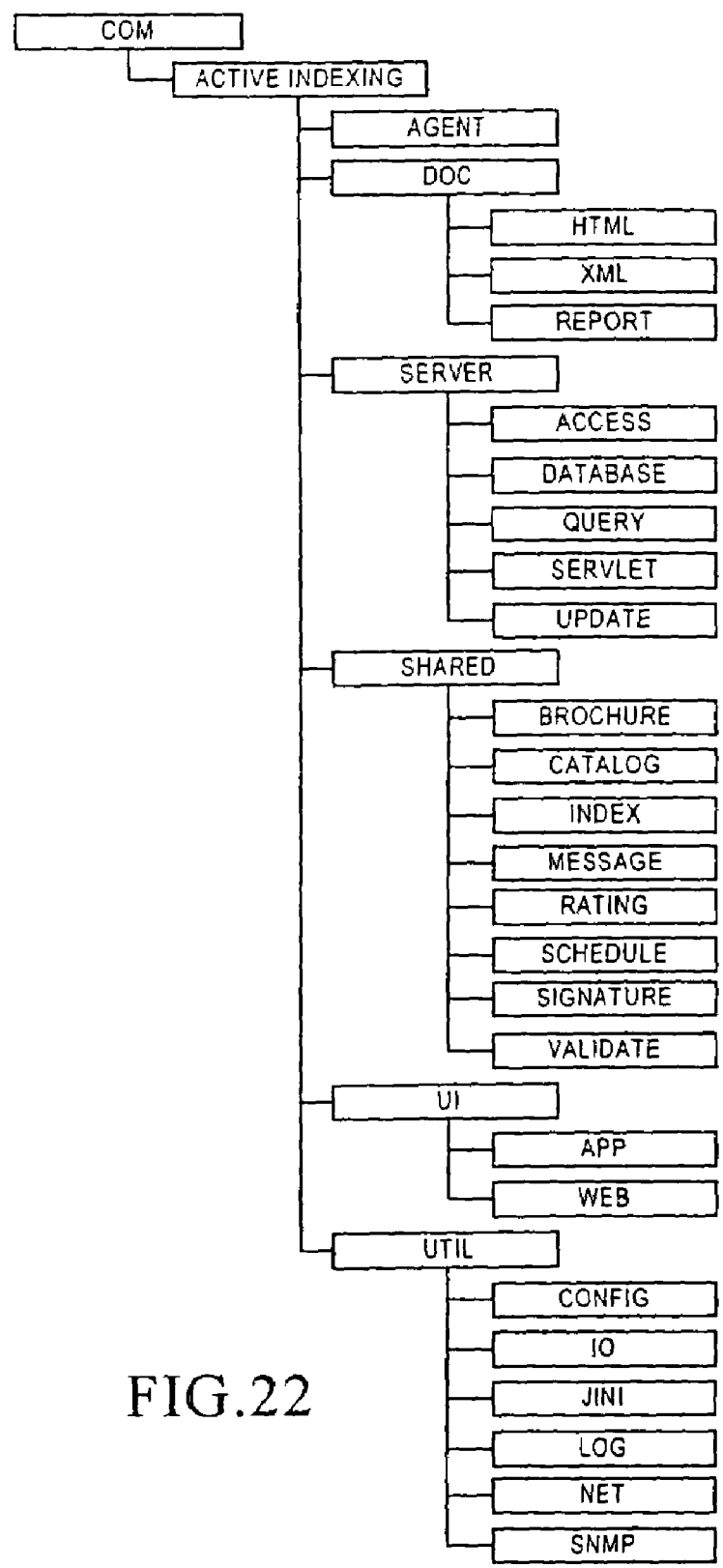

The packages presented in FIG. 22 are directly associated with services, components, or conceptual groupings in the system 200. Major services are represented by their own package, with supporting classes included. Components are given separate packages where applicable. Some services and components accomplish the same tasks and are, naturally, in the same package. Supporting classes, such as database, networking and servlets are grouped into conceptual packages for clarity.

Note that the packages are currently presented in alphabetical order, but may be reorganized in a later revision to reflect the three tiered nature of the architecture of the system 200. Low level utility packages should be listed first, followed by component/manager packages, Jini service packages, and finally independent applications.

Figure 23:
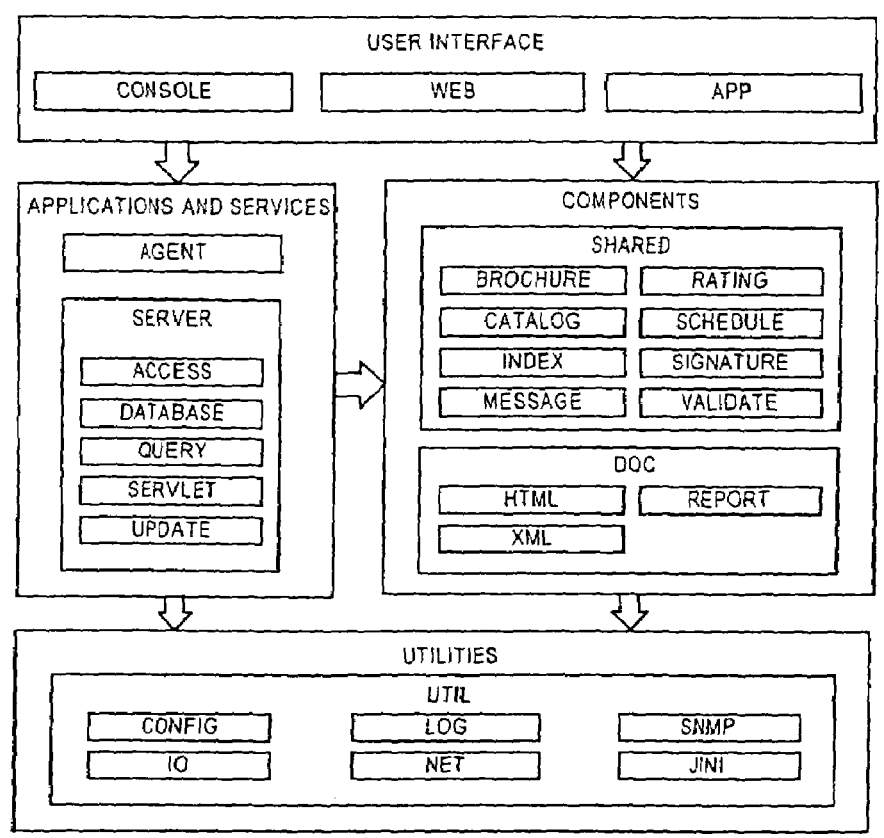

In FIG. 23, packages are categorized in three ways. They are either low-level utility packages, components, applications and services or user interface elements. Support packages, like the database, catalog, html and xml packages, provide a foundation for other program functionality. A few of the services, the message and index services, for example, are grouped as shared because several of their classes provide functional capabilities between both the agent and server elements. The brochure package is also shared. The application and service level packages construct the agent and the server-side Jini services. Taken together, the classes in these packages function together as a complete, integrated, distributable system.

Referring to FIG. 23, user interface elements are grouped into the following packages. The com.activeindexing.ui.app package contains classes related to console-based interfaces.

The com.activeindexing.ui.app package contains classes related to web-based user interfaces and contains classes related to application user interfaces.

Figure 24:
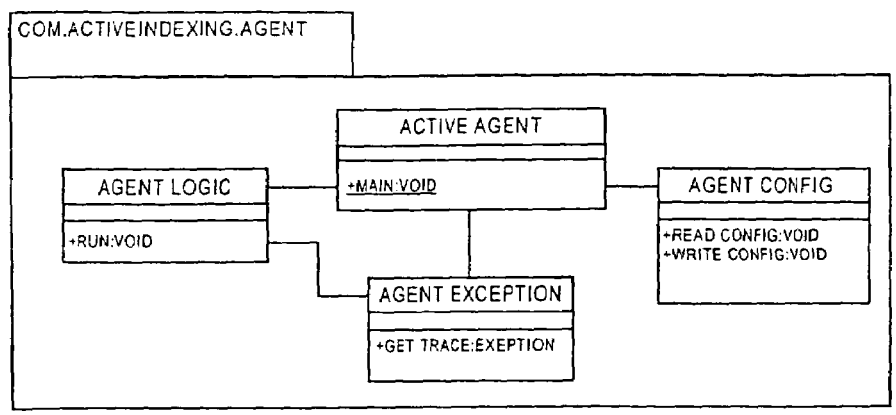

The agent 204 has its own package as shown in FIG. 24. The agent 204 has its own package primarily for distribution reasons.

The agent package, com.activeindexing.agent contains classes related to the host agent.

Referring to FIG. 23, the collection of server of packages provides high level server-side Jini services to the system.

Figure 25:
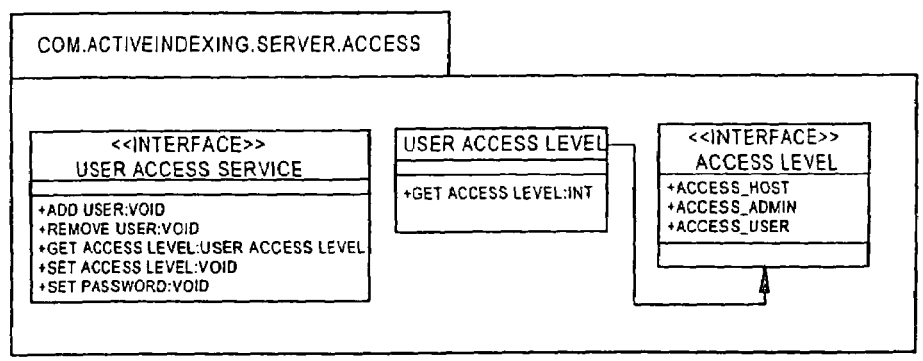

FIG. 25 illustrates the com.activeindexing.server.access package contains, which classes related to the UserAccessService.

Figure 26:
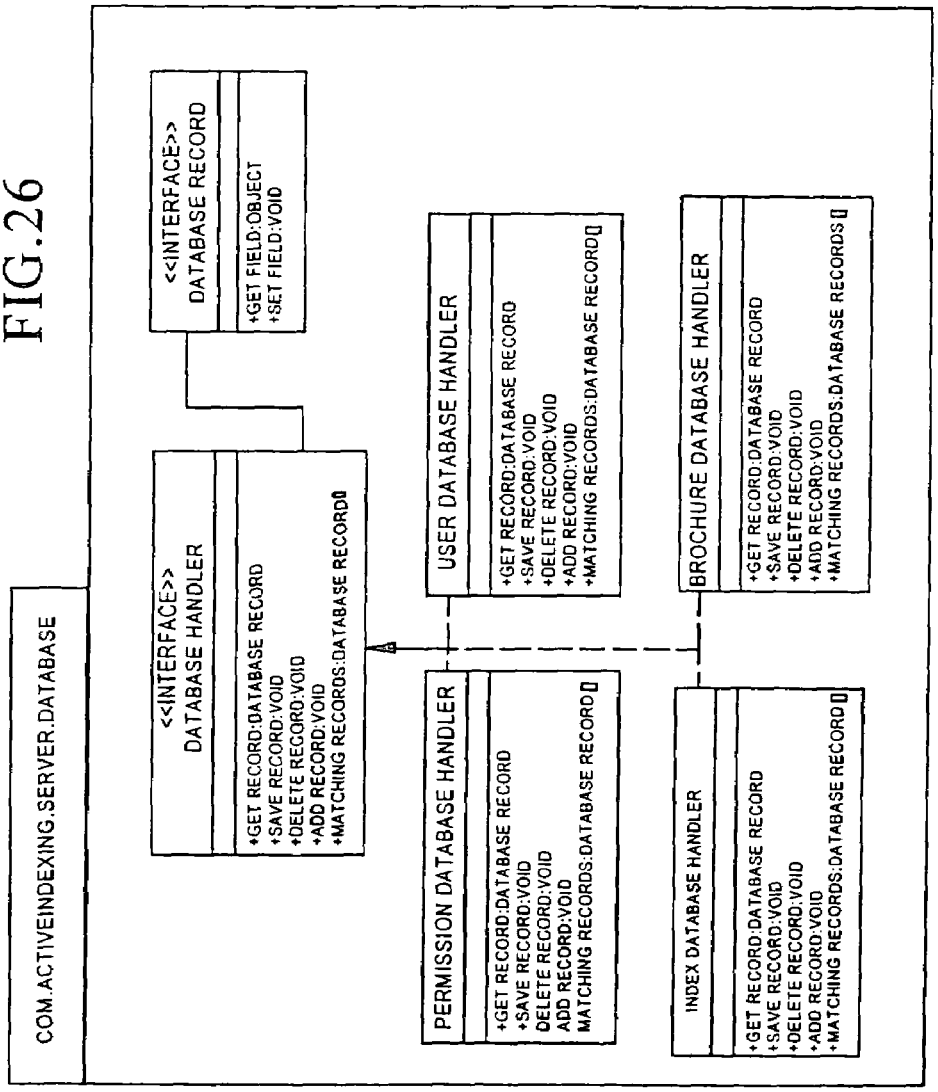

The com.activeindexing.server.database package of FIG. 23 contains classes related to database access and record handling and is shown in more detail in FIG. 26.

Figure 27:
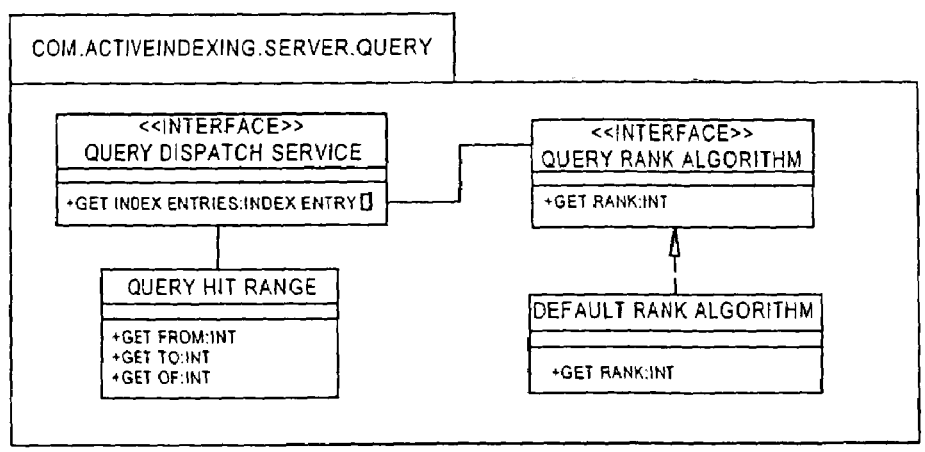

Referring to FIG. 23, the com.activeindexing.server.query package contains classes related to the QueryDispatchService, as shown in more detail in FIG. 27.

The com.activeindexing.server.servlet package contains classes related to Servlets and web servers, as shown in more detail in FIG. 27.

Figure 28:
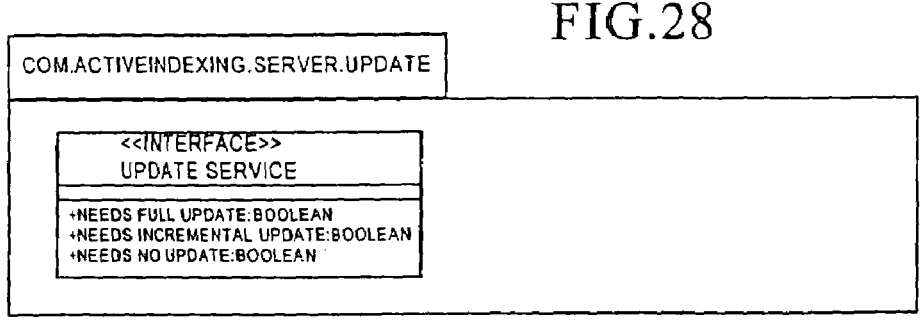

The com.activeindexing.server.update package of FIG. 23 contains classes related to the update manager, as shown in more detail in FIG. 28.

Referring to FIG. 23, the shared package contains elements which can act as components within the system, used by one or more services or applications.

Figure 29:
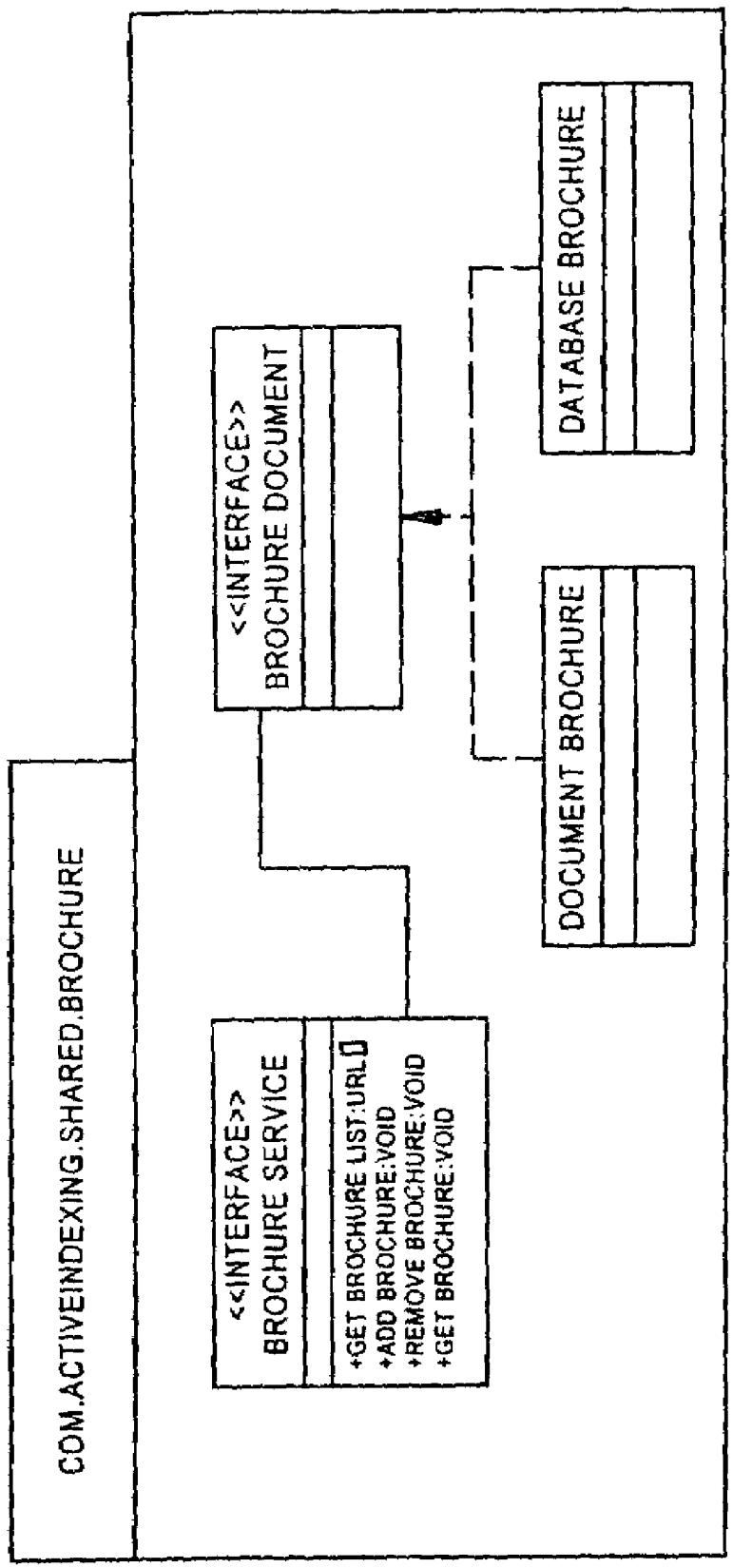
Figure 30:
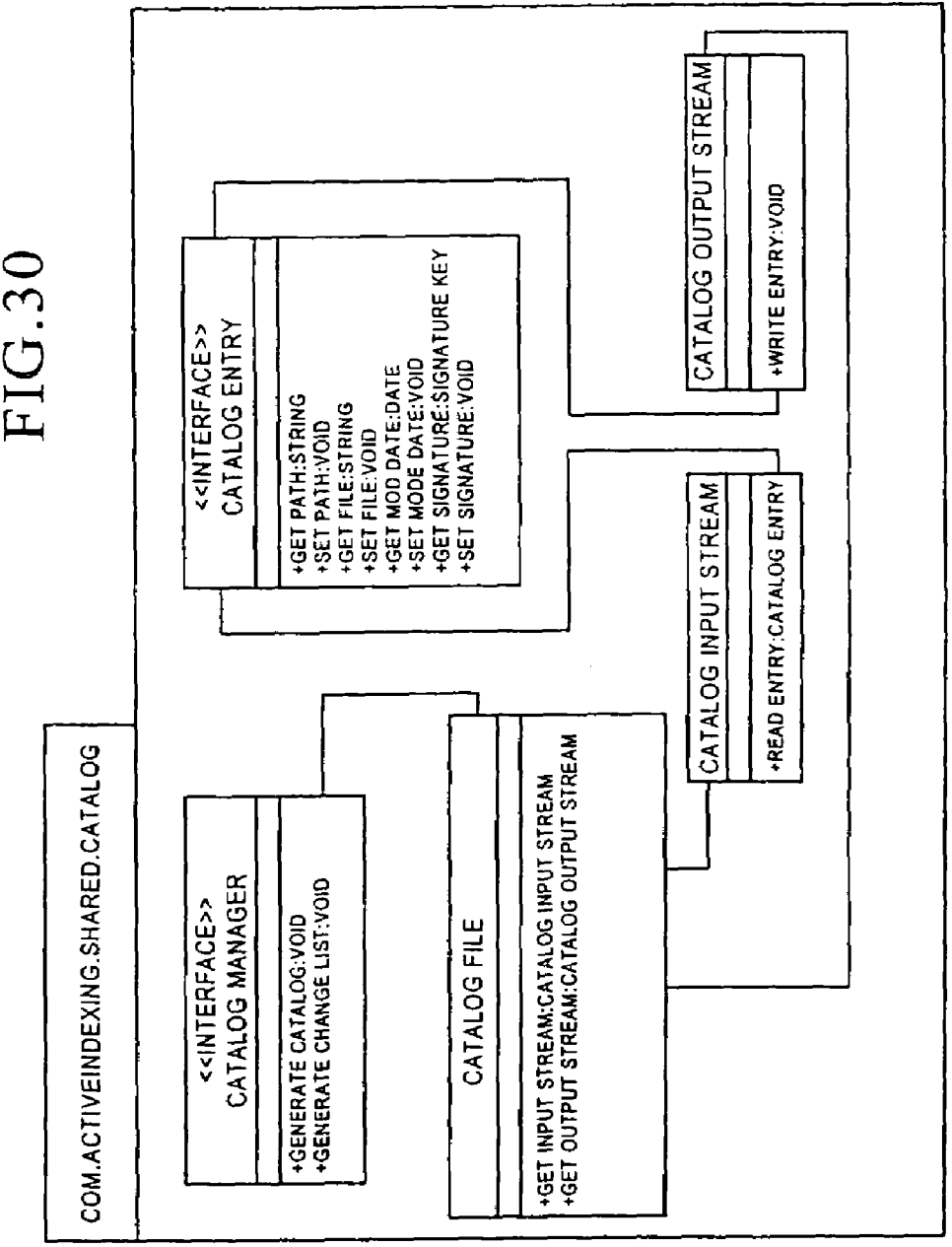

The com.activeindexing.shared.brochure package is shown in more detail in FIG. 29 and contains classes related to Brochure handling.

Figure 31:
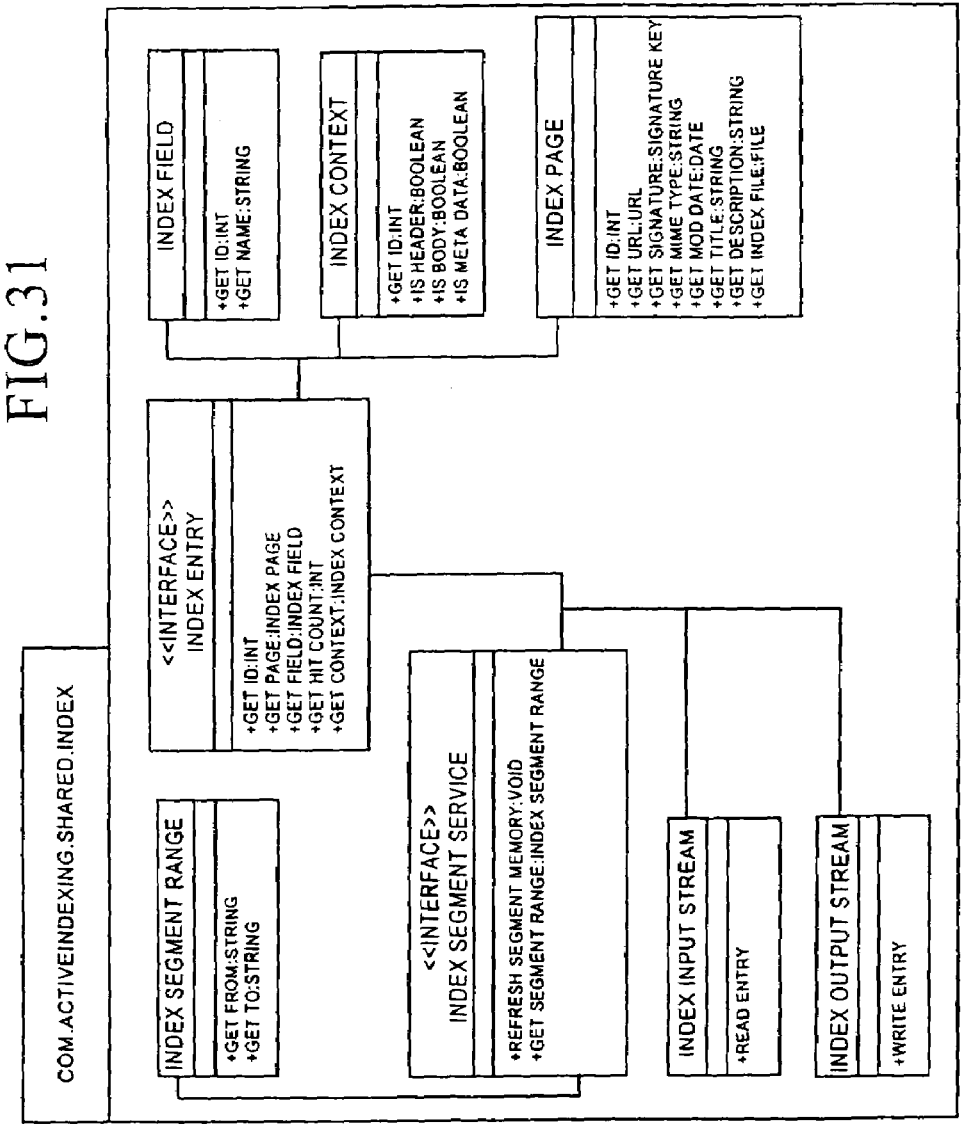

The com.activeindexing.shared.index package of FIG. 23 contains classes related to indexing and includes the IndexSegmentService as shown in more detail in FIG. 31.

Figure 32:
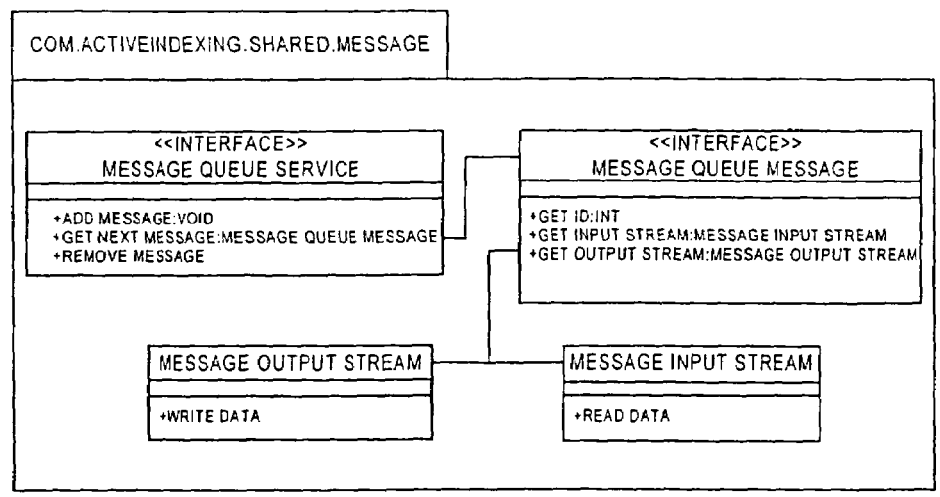

The com.activeindexing.shared.message package of FIG. 23 contains classes related to the MessageQueueService as shown in more detail in FIG. 32.

Figure 33:
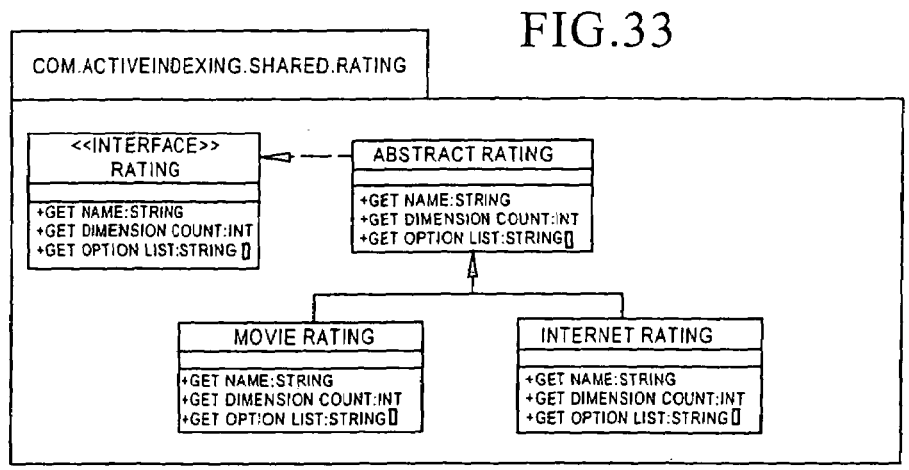

The com.activeindexing.shared.rating package of FIG. 23 contains classes related to rating systems, as shown in more detail in FIG. 33.

Figure 34:
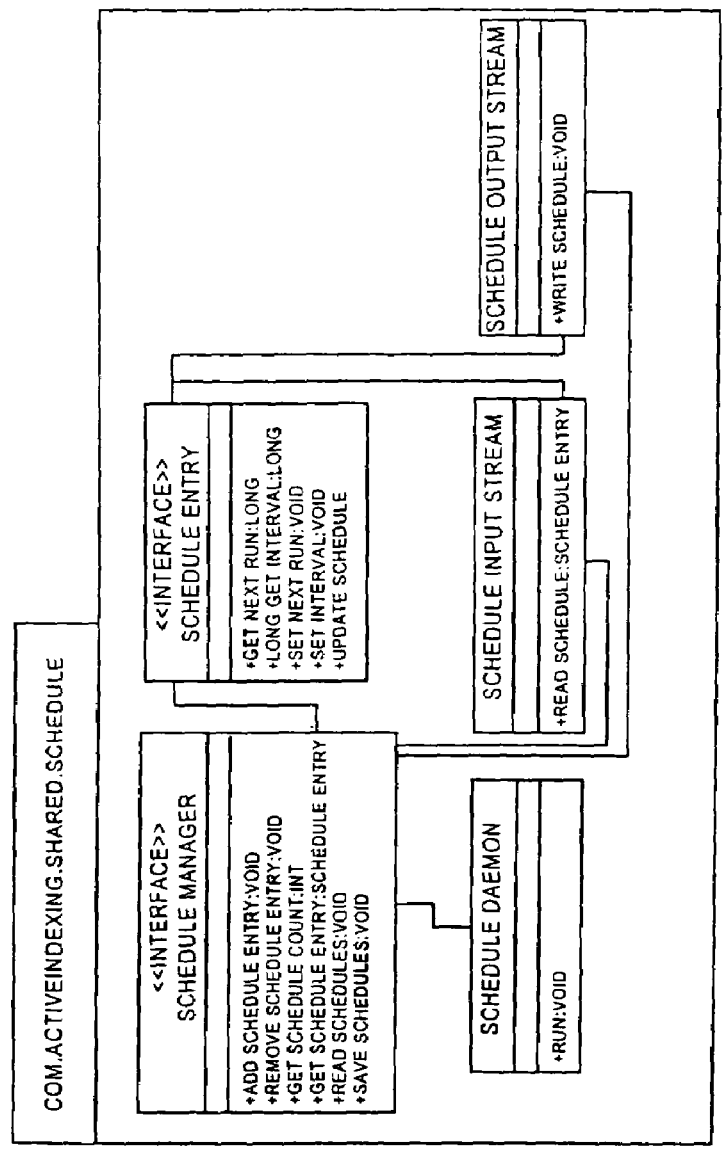

The com.activeindexing.shared.schedule package of FIG. 23 contains classes related to the ScheduleManager, as shown in FIG. 34 in more detail.

The com.activeindexing.shared.signature package of FIG. 23 contains classes related to the file signatures and hash calculations, as shown in more detail in FIG. 34.

Figure 35:
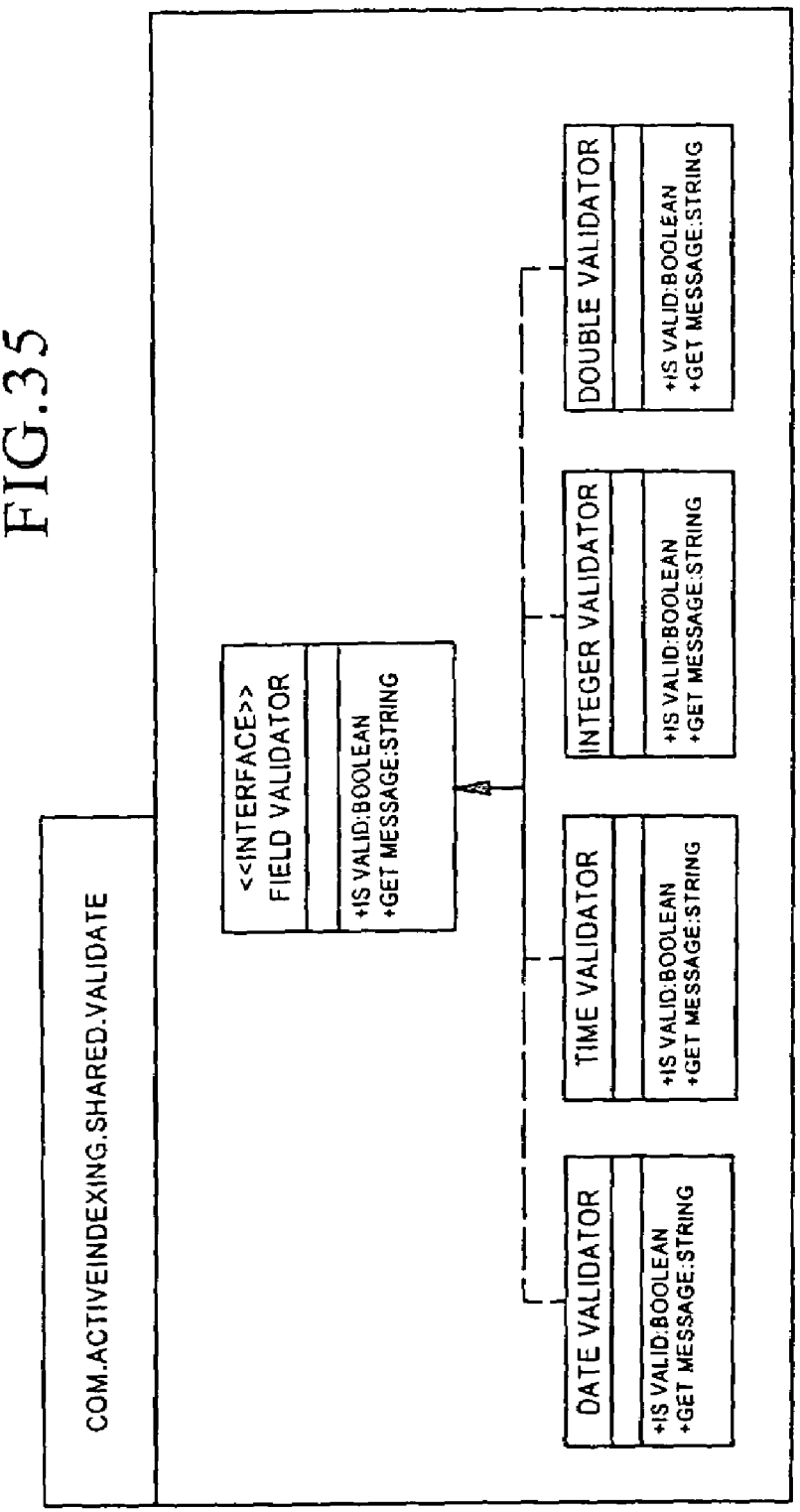

The com.activeindexing.shared.validate package of FIG. 23 contains classes related to field validation, as shown in more detail in FIG. 35.

Figure 36:
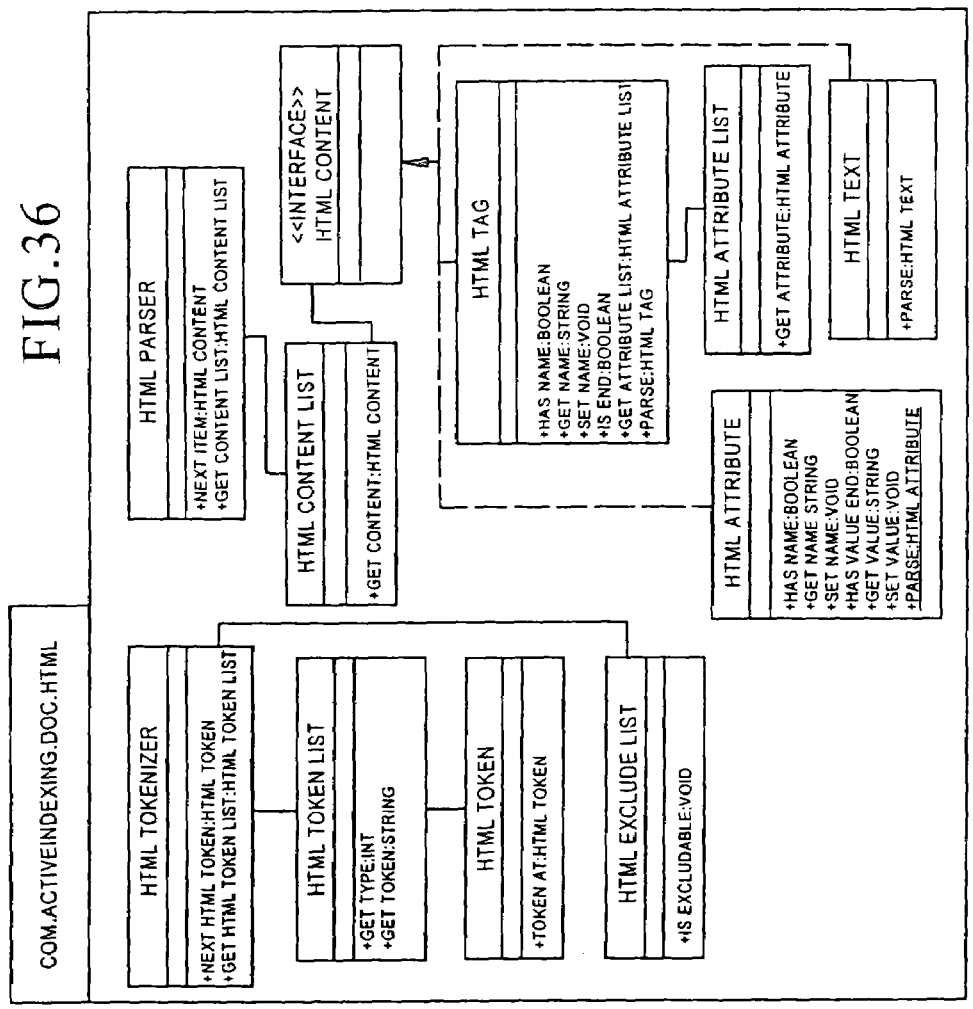

Referring to FIG. 23, the document-related packages, com.activeindexing.doc.html, contains classes related to HTML tokenizing and parsing, as shown in more detail in FIG. 36.

Figure 37:
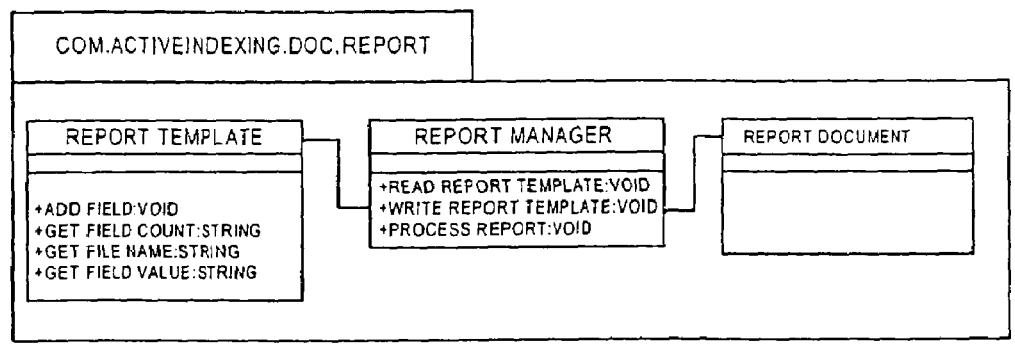

The com.activeindexing.doc.report package of FIG. 23 contains classes related to reporting, as shown in more detail in FIG. 37.

Figure 38:
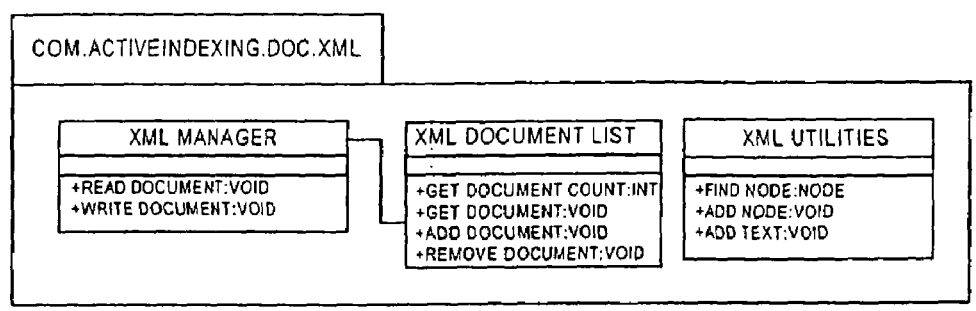

The XML package of FIG. 23, com.activeindexing.doc.xml, contains classes related to XML file management as shown in more detail in FIG. 38.

The utility package of FIG. 23 contain low-level utility packages which can be used by any other package.

The config package, com.activeindexing.util.config, contains classes related to configuration file handling, as shown in more detail in FIG. 39.

The I/O package of FIG. 23, com.activeindexing.util.io, contains utility classes related to input/output operations as shown in more detail in FIG. 40.

Figure 41:
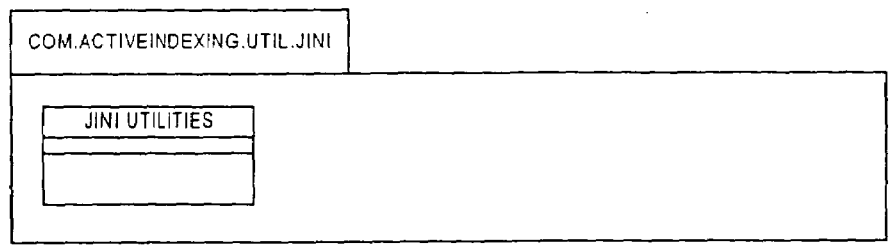

The jini package of FIG. 23, com.activeindexing.util.jini, contains classes related to Jini services as shown in more detail in FIG. 41.

Figure 42:
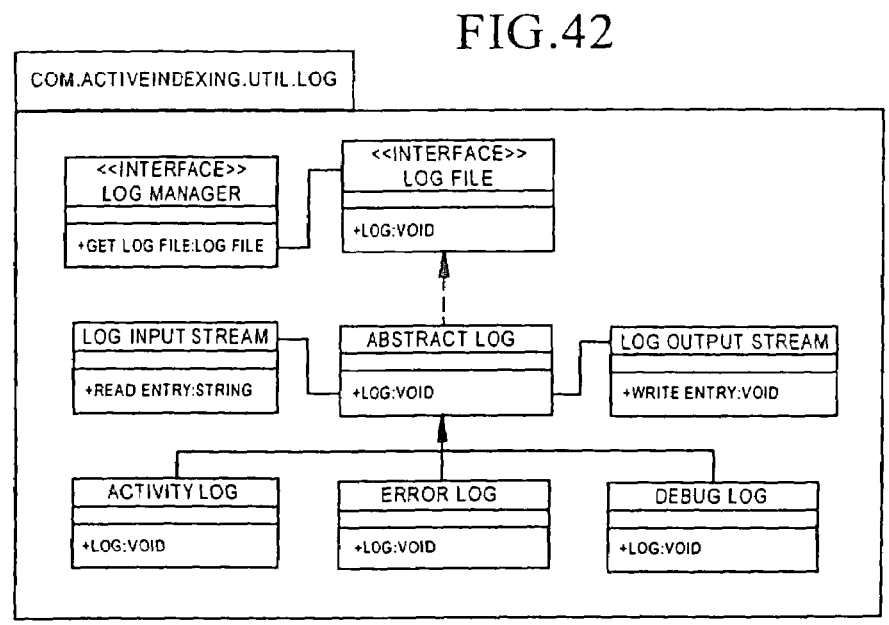

The log package of FIG. 23, com.activeindexing.util.log, contains classes related to the log files, as shown in more detail in FIG. 42.

The network package of FIG. 23, com.activeindexing.util.net, contains utility classes related to networking, as shown in more detail in FIG. 43.

The snmp package of FIG. 23, com.activeindexing.util.snmp, contains classes related to the Simple Network management Protocol, as shown in more detail in FIG. 44.

The above description does not include user interface, the XML subsystem, transactions for change requests, or a message format, but one skilled in the art will understand suitable implementations for each of these components.

Figure 45:
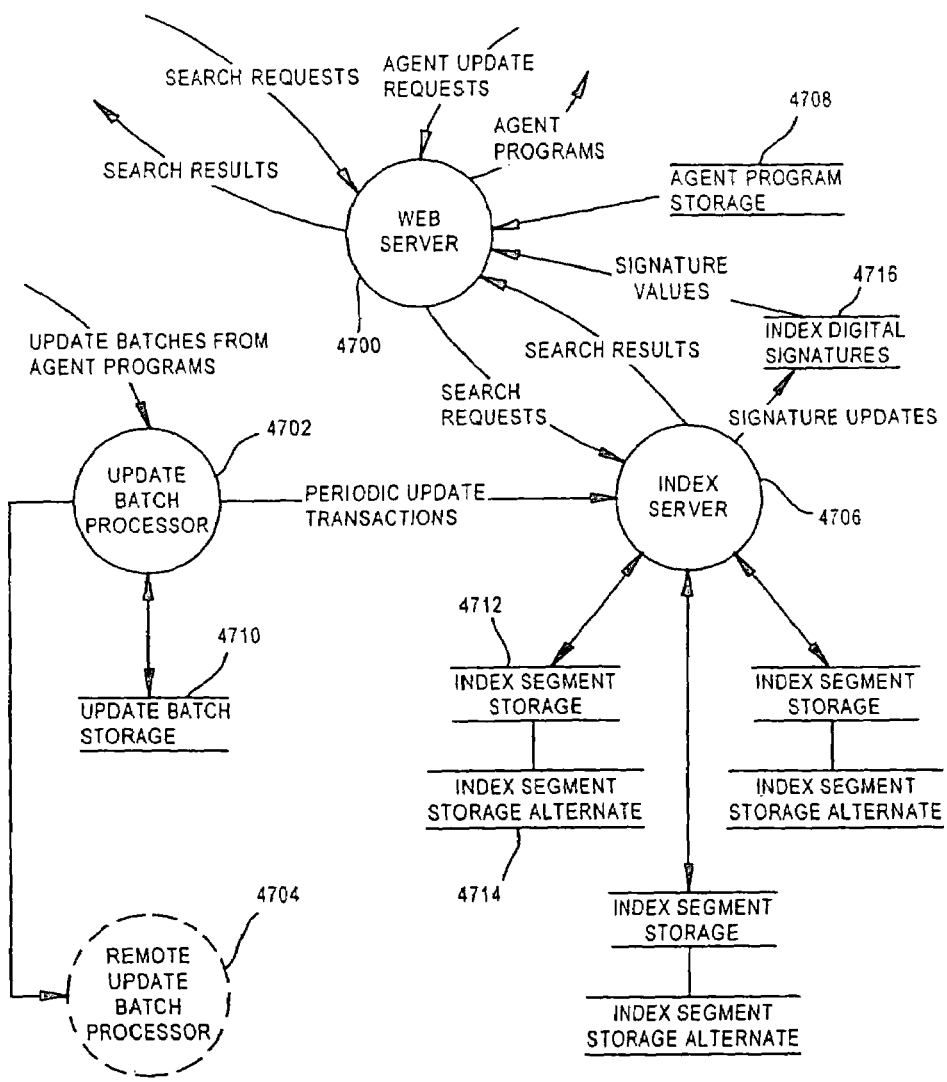

FIG. 45 is a functional data flow diagram illustrating an alternative embodiment of the central cataloging site of FIG. 2. In FIG. 45, a web server 4700 is the main gateway for all agent 204 program update requests, agent program downloads, and search requests. An update batch processor 4702 receives, stores, and applies update batches created by remote agents 204, and also transmits copies of the batches to redundant remote catalog sites. A remote update batch processor 4704 receives, and applies batches received from a master catalog site to a local index server for the purposes of redundancy. An index server 4706 stores all search index information in a series of database segments, and creates result sets from queries applied to it as a result of search requests received by the web server 4700.

The system of FIG. 45 includes an agent program storage area 4708 containing copies of agent 204 programs and the digital signatures of those programs for the various host operating systems which use agents to generate web site updates. An update batch storage area 4710 contains the received update batches transmitted by agent programs 204 on remote hosts, and these batches are deleted after processing. An index segment storage area 4712 contains a subset of the total index database for the index server 4706. For example, a single segment might contain the keyword fields for all of the keywords beginning with the letter "A". Typically, these storage areas will be placed on high-speed RAID storage systems. An index segment storage twin area 4714 is identical to the storage area 4712. The purpose of the twin area 4714 is to provide access to existing index information while the corresponding index segment storage area is being updated. This permits updates to be applied to a segment without requiring record locking. The index server 4706 is simply notified as to which segment areas are available for search processing. Once updated, the area 4712 or 4714 becomes available again. An index signature storage area 4716 that stores the current digital signature of the index for a particular site serviced by an agent 204 on a remote host.

In operation of the system of FIG. 45, the agent program, upon starting on a remote host, will query the web server 4700 to determine if the local agent program digital signature matches that of the agent program digital signature stored at the catalog site. If the local agent 204 program determines that the digital signatures of the agent programs do not match, the agent program will retrieve a new copy of itself from the web servers 4700 and restart itself after performing the appropriate local operations. Before commencing local processing, the agent program 204 checks the digital signature of the existing site index on the catalog site with the digital signature of the site stored locally. If the two signatures match, a differential transmission of catalog information will occur. Otherwise, the entire catalog will be regenerated and transmitted, and the catalog site will be instructed to delete any existing catalog entries for the site. Once a differential or full catalog update has been generated, the agent program 204 contacts the update batch processor 4702 at the catalog site and transmits the contents of the update. Upon receiving confirmation of receipt, the agent program 204 performs clean up and post-processing operations, then suspends itself until the next processing cycle.

The update processor 4702 periodically updates the index segments on the index server 4706. All updates received are applied as batches to retain data integrity on the index server 4706. The update processor 4702 separates update information as required to match the segments on the index server 4706, then updates each segment storage area 4712 and each segment storage twin area 4714. While a segment storage area 4712, 4714 is being updated, its counterpart is available for search request processing. Once all updates have been applied, the digital signature of the index for the site is updated in the index signature storage area 4716 and the batch is deleted from the update batch storage area 4710.

In processing search requests, the web servers 4700 receive and interpret the search requests from remote portals or web browsers. Each search request is preprocessed to divide the request into sub-requests as required for each index segment, then the index server 4706 is requested to perform search queries on each relevant segment. More than one index segment may be queried simultaneously. The index server 4706 determines which index segment storage areas 4712, 4714 are available for use, applies the search request, and transmits the results to the web server 4700 which, in turn, collects and collates all search results and transmits these results back to the requesting system in a formatted manner.

According to another embodiment of the agent 204, the agent calculates a value representing the distance and text between objects and thereby determines which objects at a site are most likely to relate to each other. At the catalog site, these relationship values are combined with the relationship values from other sites to create a relationship value table. This relationship value table represents the likelihood of an object occurring together with another object. This table may be used to refine searches and create relevance ranking.

It is to be understood that even though various embodiments and advantages of the present invention have been set forth in the foregoing description, the above disclosure is illustrative only, and changes may be made in detail, and yet remain within the broad principles of the invention.

Therefore, the present invention is to be limited only by the appended claims.

The invention claimed is:

1. A computer system for peer-to-peer file sharing comprising:
    a server computer having an index of information about files that reside on a plurality of peer computers, the server computer selectively coupled to the plurality of peer computers by a network;
    a plurality of agent programs running on at least two of the plurality of peer computers and operable to transmit index information to the server computer and operable to transmit a requested file; and
    a file sharing program running on the server computer and operable to perform centralized searches based on the index information transmitted to it across the network by the agent programs, to store peer computer file requests identifying a requested file transmitted across the network by a requesting peer computer of the plurality of peer computers, the requested file being referenced in the index information, and to direct a peer-to-peer computer connection for the purpose of exchanging files between the requesting peer computer and a storing peer computer storing the requested file upon detection of connection of the storing peer computer to the server.

2. The computer system of claim 1, wherein the server computer is also a peer computer.

3. The computer system of claim 1, wherein the contents of at least some of the files stored on a peer computer comprise nontextual data having meta data that comprises one or more vectors extracted from the files.

4. The computer system of claim 1, wherein each agent program creates the index information for selected files on each corresponding peer computer, the selected files selected by user input.

5. The computer system of claim 1, wherein each agent program creates the index information for selected files on each corresponding peer computer, the selected files selected by a computer algorithm.

6. The computer system of claim 1, wherein the agent program comprises a utility program that is resident in an operating system on the corresponding peer computer.

7. The computer system of claim 1, wherein the file sharing program comprises a utility program that is resident in an operating system on the corresponding server computer.

8. The computer system of claim 1, wherein the file sharing program is further operable to direct transfer of the requested file from the storing peer computer to the server upon detection of connection of the storing computer to the server when the requesting peer computer is not connected to the server, the file sharing program operable to transmit the requested file from the server to the requesting peer computer upon detection of connection of the requesting peer computer to the server.

* * * * *

UNITED STATES PATENT AND TRADEMARK OFFICE
Certificate

Patent No. 7,032,000 B2                          Patented: April 18, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gary W. Tripp, Bainbridge Island, WA (US); and Michael D. Meadway, Driftwood, TX (US).

Signed and Sealed this Nineteenth Day of October 2010.

*NATHAN FLYNN*
*Supervisory Patent Examiner*
*Art Unit 2454*
*Technology Center 2400*